(12) United States Patent
Watanabe et al.

(10) Patent No.: US 8,792,166 B2
(45) Date of Patent: Jul. 29, 2014

(54) IMAGE BLUR CORRECTION APPARATUS AND IMAGE PICKUP UNIT HAVING IMAGE BLUR CORRECTION APPARATUS

(75) Inventors: Hiroyuki Watanabe, Tokyo (JP); Yuta Nakamura, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 21 days.

(21) Appl. No.: 13/143,987

(22) PCT Filed: Jan. 12, 2010

(86) PCT No.: PCT/JP2010/050197
§ 371 (c)(1),
(2), (4) Date: Jul. 11, 2011

(87) PCT Pub. No.: WO2010/082555
PCT Pub. Date: Jul. 22, 2010

(65) Prior Publication Data
US 2011/0267692 A1    Nov. 3, 2011

(30) Foreign Application Priority Data

Jan. 14, 2009  (JP) .................................. 2009-005423
Dec. 25, 2009  (JP) .................................. 2009-294834

(51) Int. Cl.
| | |
|---|---|
| *G02B 27/64* | (2006.01) |
| *H04N 5/232* | (2006.01) |
| *G03B 17/02* | (2006.01) |
| *G03B 5/00* | (2006.01) |
| *G03B 5/02* | (2006.01) |
| *G02B 13/00* | (2006.01) |
| *H04N 1/00* | (2006.01) |
| *H04N 7/14* | (2006.01) |

(52) U.S. Cl.
CPC ............. *G03B 17/02* (2013.01); *G02B 13/001* (2013.01); *H04N 5/23248* (2013.01); *H04N 1/00307* (2013.01); *G02B 27/646* (2013.01); *G03B 5/00* (2013.01); *G02B 13/0065* (2013.01); *G03B 5/02* (2013.01); *H04N 2007/145* (2013.01); *H04N 5/23287* (2013.01); *H04N 5/23258* (2013.01); *G02B 274/648* (2013.01)
USPC .......................................... 359/557; 359/554

(58) Field of Classification Search
USPC ............... 359/557, 824, 826, 577; 396/55, 93
See application file for complete search history.

(56) References Cited

U.S. PATENT DOCUMENTS

| | | | |
|---|---|---|---|
| 5,774,266 A | 6/1998 | Otani et al. | |
| 6,008,954 A | * 12/1999 | Shintani et al. | 359/704 |
| 2006/0082674 A1 | 4/2006 | Noji | |
| 2007/0133091 A1* | 6/2007 | Ito et al. | 359/554 |
| 2007/0242938 A1* | 10/2007 | Uno et al. | 396/55 |
| 2007/0297781 A1* | 12/2007 | Kitano | 396/55 |
| 2008/0187301 A1* | 8/2008 | Takahashi | 396/55 |
| 2008/0198462 A1* | 8/2008 | Sekino | 359/557 |
| 2009/0128928 A1* | 5/2009 | Ito | 359/814 |

FOREIGN PATENT DOCUMENTS

| | | |
|---|---|---|
| EP | 1 795 956 | 6/2007 |
| EP | 1 727 358 | 5/2011 |
| JP | 5-297443 | 11/1993 |
| JP | 2006-119249 | 5/2006 |
| JP | 2006-215122 | 8/2006 |
| JP | 2006-330678 | 12/2006 |
| JP | 3869926 | 1/2007 |
| JP | 2007-163593 | 6/2007 |
| JP | 2007-233214 | 9/2007 |
| JP | 3969927 | 9/2007 |
| JP | 2007-286318 | 11/2007 |
| JP | 2008-64846 | 3/2008 |

OTHER PUBLICATIONS

International Search Report issued Mar. 16, 2010 in International (PCT) Application No. PCT/JP2010/050197.

* cited by examiner

*Primary Examiner* — Alicia M Harrington
*Assistant Examiner* — Marin Pichler
(74) *Attorney, Agent, or Firm* — Wenderoth, Lind & Ponack, LLP

(57) ABSTRACT

An image blur correction apparatus includes a base, a movable holding member, a support mechanism that supports the movable holding member to be movable within a plane vertical to an optical axis of a lens, a driving means for driving the movable holding member, a position detecting unit, and a returning unit for returning the movable holding member to a pause position, wherein the driving unit includes coils fixed to the base and drive magnets fixed to the movable holding member, the returning unit includes return magnets fixed to the base to face the drive magnets, the position detecting means includes magnetic sensors fixed to the base, and the support mechanism includes at least three concave portions provided on the base, at least three spheres rollably arranged in the concave portions, and at least three abutment surfaces provided on the movable holding member to abut on the spheres.

10 Claims, 30 Drawing Sheets

IMAGE BLUR CORRECTION APPARATUS AND IMAGE PICKUP UNIT HAVING IMAGE BLUR CORRECTION APPARATUS

CROSS REFERENCE TO RELATED APPLICATIONS

The present application is the national stage entry of PCT/JP2010/050197, which has an international filing date of Jan. 12, 2010, and claims priority to JP2009-005423, filed Jan. 14, 2009, and to JP2009-294834, filed Dec. 25, 2009.

BACKGROUND OF THE INVENTION

I. Technical Field

The present invention relates to an image blur correction apparatus (image stabilization device) mounted in, e.g., a lens body tube or a shutter unit of a digital camera and an image pickup unit having this image blur correction apparatus, and more particularly to a small and thin image blur correction apparatus applied to a camera mounted in a personal digital assistance such as a mobile phone and an image pickup unit having this image blur correction apparatus.

II. Description of the Related Art

As a conventional image blur correction apparatus (image stabilization device), there is known an image blur correction apparatus including a substantially rectangular base having an opening portion at the center, a first guide shaft provided on a front surface of the base, a first movable member supported to be reciprocable along the first guide shaft, a second guide shaft that is directed to a 90-degree direction with respect to the first guide shaft and provided on a front surface of the first movable member, a second movable member that is supported to be reciprocable along the second guide shaft and holds lenses, a first drive device that reciprocates the first movable member and the second movable member in a direction of the first guide shaft together, and a second drive device that reciprocates the second movable member in the direction of the second guide shaft, the apparatus adopting a voice coil motor including a coil and a magnet as each of the first drive device and the second drive device (see, e.g., Japanese Unexamimed Patent Application Publication No. 2007-296318).

However, this apparatus adopts a double configuration that the first movable member and the second movable member are aligned in an optical axis direction, and hence the apparatus increases in size in the optical axis direction. Further, although the second drive device drives the second movable member alone, the first drive device must drive not only the first movable member but also the second movable member and the second guide shaft together, and hence larger drive force must be generated as compared with a situation where the first movable member alone is driven, thereby resulting in an increase in size of the first drive device. Furthermore, since a drive load of the first drive device is different from a drive load of the second drive device, drive control for positioning the lenses within a plane vertical to the optical axis is not easy.

Furthermore, as another image blur correction apparatus (image stabilization device), there is known an image blur correction apparatus including a substantially rectangular base having an opening, four elastic support members (wires) that are implanted at four corners of a front surface of the base and extend in an optical axis direction, a movable member that is coupled with ends of the four elastic support members to hold lenses, a first magnet and a first yoke provided to the movable member, a second magnet and a second yoke provided to the movable member, and a substantially rectangular fixed frame that is fixed to another member different from the base and arranged in front of the movable member to hold a first coil and a second coil, the apparatus having a configuration that the first magnet, the first yoke, and the first coil constitute first a driving means, the second magnet, the second yoke, and the second coil constitute a second driving means, the first driving means drives the movable member in a first direction vertical to the optical axis, and the second driving means drives the movable member in a second direction vertical to the optical axis and the first direction (see, e.g., Japanese Unexamined Patent Application Publication No. 2008-64846and Japanese Unexamined Patent Application Publication No. 2007-233214).

However, in this apparatus, the size of the apparatus increases in the optical axis direction since the movable member is supported on the base by using the four elastic support members (the wires) that extend in the optical axis direction and the fixed frame holding the coil is supported by another member in front of the movable member. Further, the movable member (the lenses) may be possible to not only be moved in a plane direction vertical to the optical axis but also inclined with respect to the optical axis since the coupling portions of the four elastic support members are coupled in a rigid form rather than a link form, and desired return characteristics may be not obtained due to a variation per time in the elastic support members (the wires). Moreover, although the movable member is coupled with the base, since the fixed frame holding the coil is not integrally coupled, the image blur correction apparatus cannot be formed as a module, handling is inconvenient, the first magnet and the second magnet of the movable member and the first coil and the second coil of the fixed frame cannot be positioned with one member (e.g., the base) being determined as a reference, and hence an assembling operation of the apparatus is troublesome.

Additionally, as still another image blur correction apparatus (image stabilization device), there is known an image blur correction apparatus including a base, a movable member holding lenses, three balls and coil springs as a support mechanism that supports the movable member to be movable with respect to the base, a driving means (a driving magnet, a coil, and a yoke) for driving the movable member in a direction vertical to an optical axis, and a position detecting means (a magnet, a hall element) for detecting a position of the movable member (see, e.g., Japanese Patent No. 3969927).

In this apparatus, since the three rolling balls are interposed between the movable member and the base, thickness of the apparatus can be reduced in the optical axis direction, but the driving means must generate a driving force that can resist urging force of the coil springs because the coil springs exercise the urging force so that the movable member can be constantly supported in contact with the three balls and the urging force of the coil springs functions as a resisting force, i.e., a drive load when driving the movable member, an operation of latching the coil springs is troublesome, and an overall assembling operation is not easy.

Additionally, as yet another image blur correction apparatus (image stabilization device), there is known an image blur correction apparatus including a base, a movable member holding lenses, a first driving means (a magnet, a coil, a yoke) and a second driving means (a magnet, a coil, a yoke) for driving the movable member in two directions vertical to an optical axis, two assist springs configured to return (center) the movable member to a central position in a non-energized state (a pause state) that the coils are not energized, and others (see, e.g., Japanese Patent No. 3869926).

In this apparatus, since the assist springs are adopted as a returning means for returning the movable member to the central position, an arrangement space for the assist springs is required, an increase in size and others of the apparatus occurs, an operation of latching the assist springs is troublesome, and an overall assembling operation is not easy.

SUMMARY OF THE INVENTION

In view of the above-described problem, it is an object of the present invention to provide an image blur correction apparatus that can be mounted in a camera of a mobile phone and the like while achieving simplification of a structure, a reduction in size and thickness of the apparatus in an optical axis direction of lenses and a direction vertical to the optical axis direction, simplification and facilitation of an assembling operation, and others and that can highly accurately correct an image blur caused due to hand movement and automatically return (center) a correction lens to a predetermined pause position in a pause state, and to provide an image pickup unit having this image blur correction apparatus.

An image blur correction apparatus according to the present invention includes: a base having an opening portion; a movable holding member that holds a lens; a support mechanism that supports the movable holding member to be movable within a plane vertical to an optical axis of the lens; a driving means for driving the movable holding member within the plane; a position detecting means for detecting a position of the movable holding member; and a returning means for returning the movable holding member to a predetermined pause position in a pause state, wherein the driving means includes a coil fixed to one of the base and the movable holding member, and a drive magnet fixed to the other of the base and the movable holding member at a position where the drive magnet faces the coil, the returning means includes a return magnet that faces the drive magnet and is fixed to one of the base and the movable holding member to generate magnetic force for returning to the pause position, the position detecting means includes a magnetic sensor fixed to one of the base and the movable holding member at a position where the magnetic sensor faces the drive magnet, and the support mechanism includes at least three concave portions provided on one of the base and the movable holding member, at least three spheres rollably arranged in the at least three concave portions in a protruding state, and at least three abutment surfaces provided on the other of the base and the movable holding member to abut on the at least three spheres.

According to this configuration, the movable holding member is two-dimensionally moved with respect to the base within the plane vertical to the optical axis by the drive force produced by the energization of the coil in cooperation with the drive magnet in the state that the movable holding member is movably supported based on a relationship between the spheres arranged in the concave portions as the support mechanism and the abutment surfaces, thereby highly accurately correcting an image blur caused due to hand movement and the like.

Here, when the movable holding member is arranged to face the base in such a manner that the spheres are arranged in the concave portions and abut on the abutment surfaces, since the return magnet fixed to one of the base and the movable holding member and the drive magnet fixed to the other exercise magnetic attractive force each other, the movable holding member can be movably incorporated into the base without using conventional springs that exerts urging force.

Further, the magnetic attracting action can be obtained between the return magnet and the drive magnet, and the movable holding member (the lens) is automatically returned to (e.g., centered to) and stably held at a predetermined pause position (e.g., a position at which the optical axis of the lens coincides with the center of the opening portion of the base). Therefore, drive control, e.g., initialization is not required at the time of driving, and shakiness and others of the movable holding member can be avoided in the pause state. Since the drive magnet of the driving means also serves as a magnet that magnetically interacts with the return magnet in this manner, simplification of the structure, a reduction in size of the apparatus, and others can be achieved.

In the above configuration, it is possible to adopt a configuration that the movable holding member has: a holding portion in which the lens is fitted and held; two extending portions extending on both sides to sandwich the holding portion; and the at least three abutment surfaces, and the base has: the opening portion which is configured to movably receive the holding portion or formed in a region facing the holding portion; and the at least three concave portions.

According to this configuration, at the time of assembling the apparatus, when the spheres are fitted into the concave portions of the base and the movable holding member is installed in such a manner that the abutment surfaces abut on the spheres from above, the assembling operation for the apparatus can be easily performed based on the simple procedure, the apparatus can be reduced in thickness along the optical axis direction, and the apparatus can be narrowed and miniaturized in a direction vertical to the optical axis and a direction vertical to the longitudinal direction of the movable holding member.

In the above configuration, it is possible to adopt a configuration that the base includes: a case-like base that defines the opening portion, the at least three concave portions, and an outer peripheral wall formed to surround a periphery of the movable holding member; and a cover-like base that is detachably coupled with the case-like base to regulate separation of the movable holding member in the optical axis direction in a state that the spheres and the movable holding member are accommodated in the case-like base.

According to this configuration, as well as the magnetic attractive force of the return magnet and the drive magnet, provision of the cover-like base enables supporting the movable holding member to be movable with respect to the case-like base and also enables assuredly preventing the movable holding member from coming off the case-like base in the optical axis direction even if, e.g., impulsive force is received from the outside. In particular, since the movable holding member and the spheres are accommodated in the case-like base and the cover-like base is coupled from above, the apparatus can be provided as a module produce, which can be conveniently handled.

In the above-described configuration, it is possible to adopt a configuration that the at least three spheres include at least two spheres arranged in regions facing the extending portion on one side and the extending portion on the other side to sandwich the holding portion of the movable holding member, the at least three concave portions include at least two concave portions arranged at positions corresponding to the at least two spheres, and the at least three abutment surfaces include at least two abutment surfaces arranged at positions corresponding to the at least two spheres.

According to this configuration, the movable holding member can be evenly supported in the longitudinal direction without being biased, whereby the movable holding member can be smoothly and highly accurately driven to be located at a desired position.

In the above-described configuration, it is possible to adopt a configuration that the at least three spheres include one sphere arranged on a straight line that is vertical to the optical axis and a longitudinal direction of the movable holding member and runs through the center of the holding portion or the opening portion and two spheres arranged at positions that are line-symmetric with respect to the straight line, the at least three concave portions include one concave portion arranged in a region corresponding to the one sphere and two concave portions arranged in regions corresponding to the two spheres, and the at least three abutment surfaces include one abutment surface arranged in a region corresponding to the one sphere and two abutment surfaces arranged in regions corresponding to the two spheres.

According to this configuration, in case the drive magnets fixed to the movable holding member are horizontally symmetrically arranged with respect to the straight line, loads applied to the spheres can be arranged in a well-balanced manner while using the small number of spheres, and the movable holding member can be supported to smoothly move.

In the above-described configuration, it is possible to adopt a configuration that the holding portion is formed so as to fit and hold a lens whose an outer periphery is partially cut, and the one concave portion, the one sphere, and the one abutment surface are arranged near an outer wall of the holding portion on the straight line.

According to this configuration, in the direction of the straight line that is vertical to the optical axis and the longitudinal direction of the movable holding member and runs through the center of the holding portion or the opening portion, the apparatus can be further reduced in thickness and size.

In the above-described configuration, it is possible to adopt a configuration that one of the base and the movable holding member has a plurality of coupling pins extending in a direction parallel to the plane, and the other of the base and the movable holding member has a plurality of coupling portions coupled with the coupling pins to allow the movable holding member to two-dimensionally move in the plane.

According to this configuration, as well as the magnetic attractive force of the return magnet and the drive magnet, an engagement relationship between the coupling pins and the coupling portions enables supporting the movable holding member to be movable with respect to the base and also enables assuredly preventing the movable holding member from coming off the base in the optical axis direction.

In the above-described configuration, it is possible to adopt a configuration that the driving means includes a first drive mechanism that drives in a first direction within the plane, and a second drive mechanism that drives in a second direction within the plane, the coil includes a first coil included in the first drive mechanism, and a second coil included in the second drive mechanism, the drive magnet includes a first drive magnet that is included in the first drive mechanism and faces the first coil, and a second drive magnet that is included in the second drive mechanism and faces the second coil, the return magnet comprises: a first return magnet facing the first drive magnet; and a second return magnet facing the second drive magnet, and the magnetic sensor includes a first magnetic sensor facing the first drive magnet, and a second magnetic sensor facing the second drive magnet.

According to this configuration, the movable holding member can be moved within the plane vertical to the optical axis by using the first drive mechanism (the first drive magnet, the first coil) and the second drive mechanism (the second drive magnet, the second coil), and the movable holding member can be returned to be positioned and held at the predetermined pause position by the magnetic attractive action of the first return magnet and the first drive magnet and the magnetic attractive action of the second return magnet and the second drive magnet.

In the above-described configuration, it is possible to adopt a configuration that the first drive mechanism drives the movable holding member within the plane in a direction vertical to the longitudinal direction thereof, the first drive magnet is constituted of two drive magnets arranged on the two extending portions to sandwich the holding portion in the movable holding member, the first coil is constituted of two coils arranged to face the two drive magnets of the first drive magnet in the case-like base, the first return magnet is constituted of two return magnets arranged to face the two drive magnets of the first drive magnet in the case-like base, and the first magnetic sensor is constituted of at least one magnetic sensor arranged to face at least one of the two drive magnets of the first drive magnet in the cover-like base.

According to this configuration, since the first drive mechanism that drives the movable holding member in the first direction vertical to the longitudinal direction thereof is constituted of the two drive magnets arranged on both sides of the movable holding member in the longitudinal direction and the two coils corresponding to the two drive magnets, drive forces are produced on both the sides of the movable holding member in the longitudinal direction when generating the drive forces in the first direction, and hence a rotational moment that rotates the movable holding member can be prevented from being generated, whereby the movable holding member can be highly accurately driven with the simple structure. It is to be noted that arranging the first magnetic sensor to face at least one of the drive magnets is sufficient, but adopting the two magnetic sensors arranged to face the respective two drive magnets enables more highly accurately driving the position of the movable holding member (the lens).

Further, an image pickup unit according to the present invention includes a plurality of lenses for imaging, an image pickup element, and a housing, wherein the unit is characterized by including an image blur correction apparatus having the above-described configuration.

According to this configuration, since the structure that the plurality of lenses for imaging are arranged in the optical direction includes the image blur correction apparatus, a correction lens held by the movable holding member is appropriately driven, and an image blur caused due to hand movement and the like can be highly accurately corrected, thereby obtaining an excellent shot image by the image pickup element.

That is, it is possible to provide the image pickup unit in which the image blur correcting function is added besides the plurality of lenses for imaging, the image pickup element, and the housing.

According to the above-mentioned configured image blur correction apparatus, it is possible to obtain the image blur correction apparatus that can be mounted in a camera of, e.g., a mobile phone while achieving simplification of the structure, a reduction in size and thickness of the apparatus in the optical axis direction of the lens and the direction vertical to the optical axis direction, simplification and facilitation of an assembling operation, and others and that can return (center) the correction lens to the predetermined pause position in the pause state, and the image pickup unit including this image blur correction apparatus can be also obtained.

DETAILED DESCRIPTION OF THE INVENTION

Embodiments of the present invention will now be described hereinafter with reference to the accompanying drawings.

Figure 1:
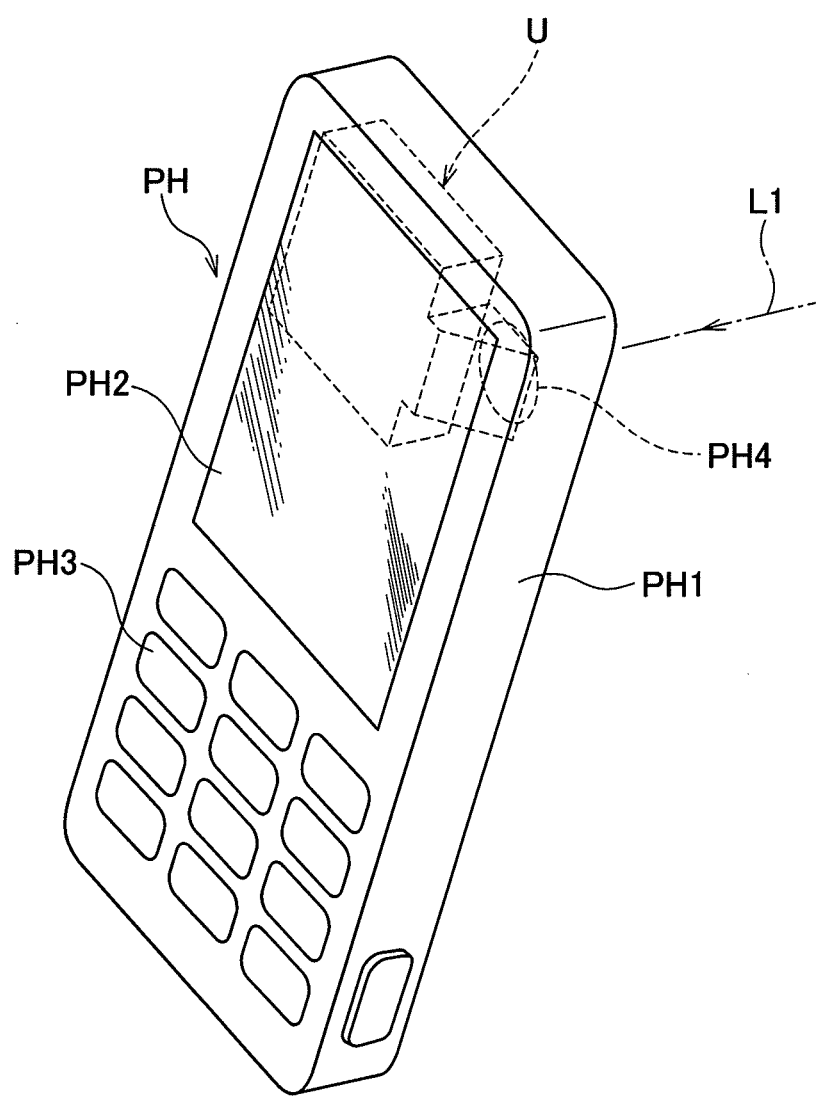
FIG. 1 is a perspective view showing a personal digital assistance in which an image pickup unit having an image blur correction apparatus according to the present invention incorporated therein is mounted.

As shown in FIG. 1, an image pickup unit U having this image blur correction apparatus incorporated therein is mounted as a camera in a flat and small personal digital assistance PH. The personal digital assistance PH includes a housing PH1 having a substantially rectangular and flat outline, a display unit PH2 such as a liquid crystal panel that is arranged on a surface of the housing PH1 and configured to display various kinds of information, operation buttons PH3, an imaging window PH4 formed on a surface of the display unit PH2 on the opposite side, and others. Further, the image pickup unit U as a camera is accommodated in the housing PH1 in such a manner that this unit extends in a direction vertical to an optical axis L1 of subject light entering from the imaging window PH4 as shown in FIG. 1.

Figure 2:
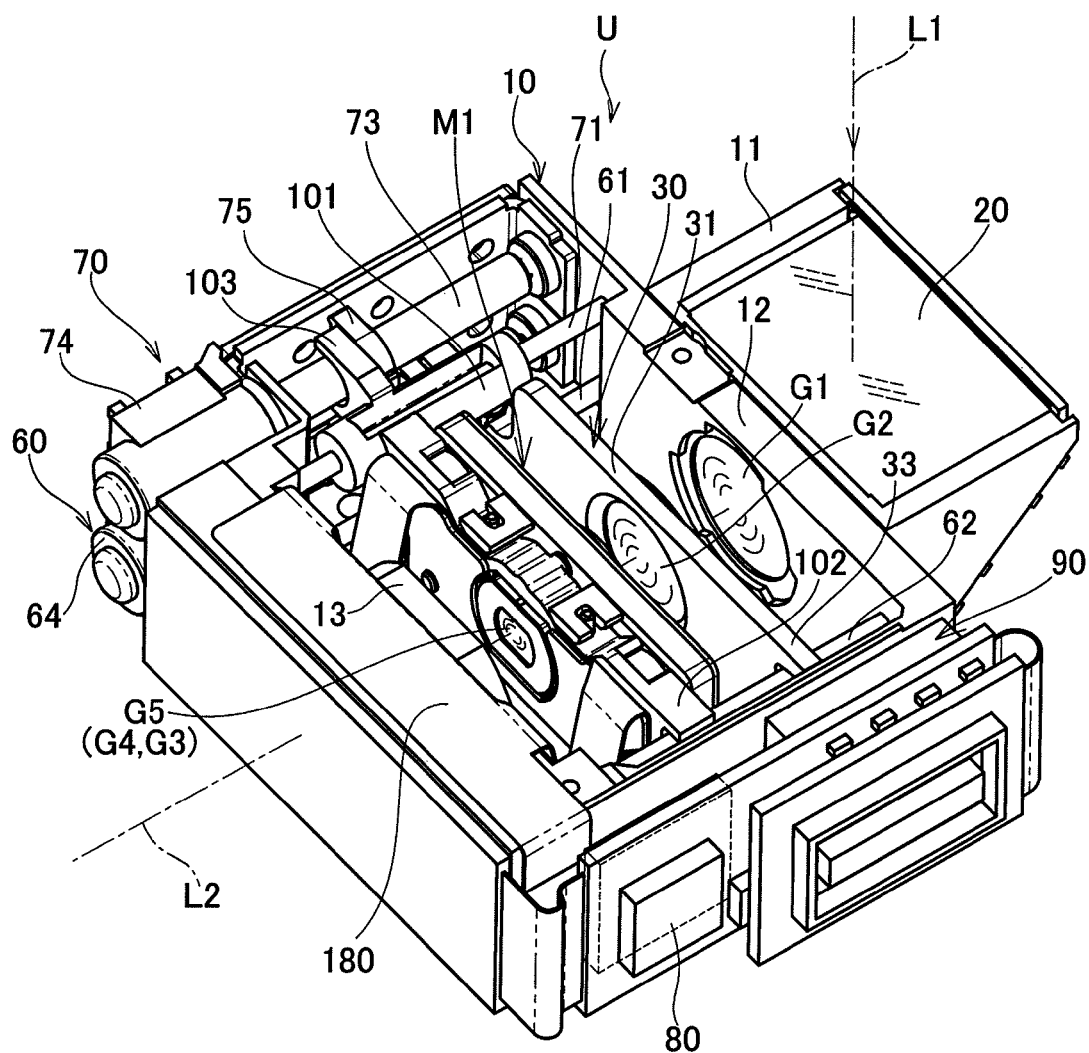
FIG. 2 is a perspective view showing the image pickup unit.
Figure 3:
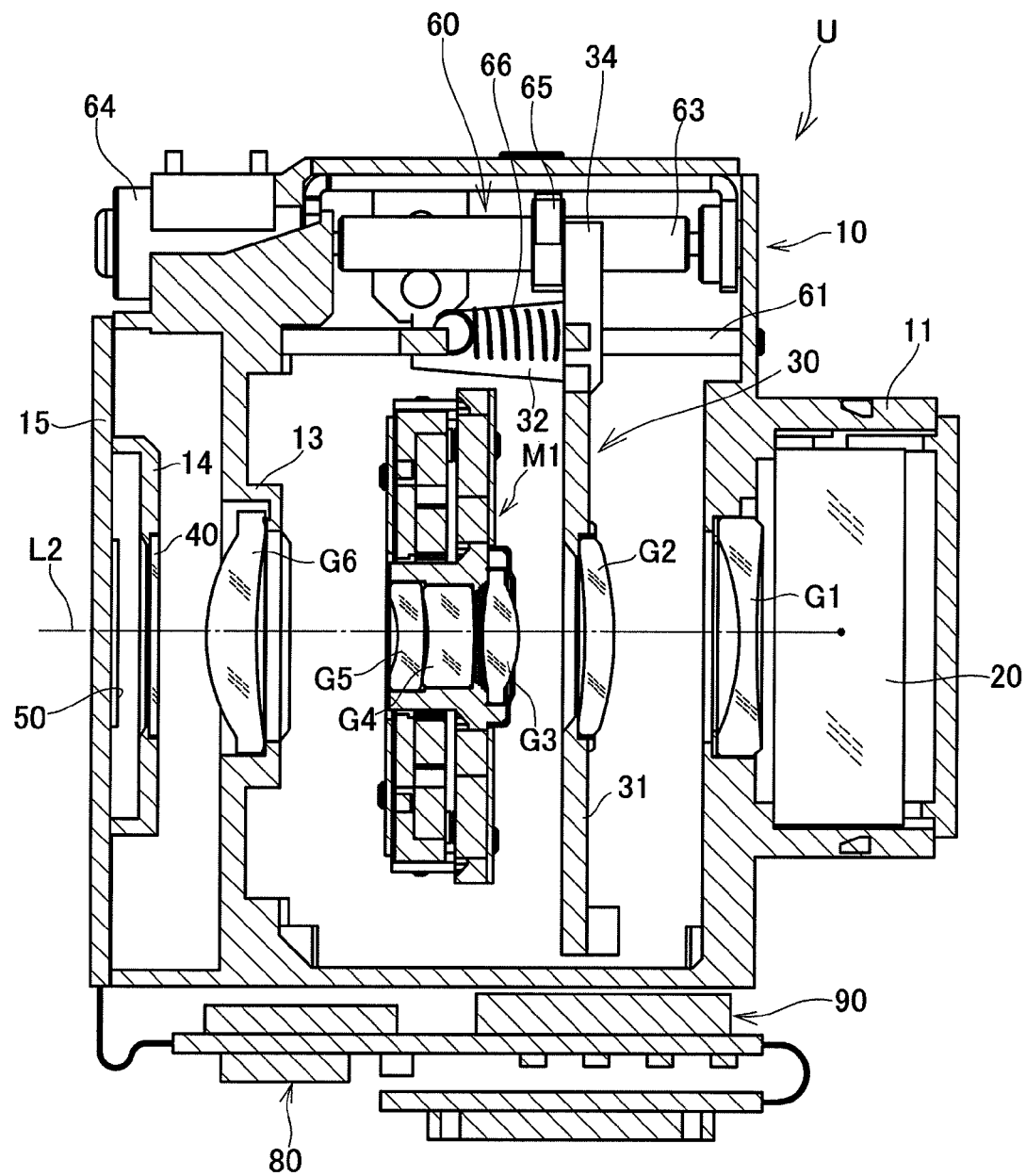
FIG. 3 is a cross-sectional view showing the inside of the image pickup unit.

As shown in FIG. 2 and FIG. 3, the image pickup unit U includes a unit case 10 as a housing, a prism 20, a lens G1, a first movable lens group 30 configured to hold a lens G2, an image blur correction apparatus M1 as a second movable lens group configured to hold lenses G3, G4, and G5, a lens G6, a filter 40, an image pickup element 50 configured to perform photoelectric conversion like a CCD, a CMOS, or a Live MOS, a first drive unit 60 configured to drive the first movable lens group 30 in an optical axis L2 direction, a second drive unit 70 configured to drive the second movable lens group (the image blur correction apparatus M1) in the optical axis L2 direction, an angular velocity sensor 80, a control unit 90, and others.

As shown in FIG. 2 and FIG. 3, the unit case 10 is formed into a flat and substantially rectangular shape in such a manner that a thickness dimension in an optical axis L1 direction becomes small and a length dimension in the optical axis L2 direction becomes small, and it includes a protruding portion 11 configured to fix the prism 20, a holding portion 12 configured to hold the lens G1, a holding portion 13 configured to hold the lens G6, a holding portion 14 configured to hold the filter 40, a holding portion 15 configured to hold the image pickup element 50, and others.

As shown in FIG. 2 and FIG. 3, the prism 20 is accommodated in the protruding portion 11 of the unit case 10 and configured to bend the optical axis L1 of subject light entering from the imaging window PH4 at a right angle and to lead this light along the optical axis L2 direction.

As shown in FIG. 2 and FIG. 3, the lens G1 is arranged behind the prism 20 in the optical axis L1 and L2 directions and fixed to the holding portion 12 of the unit case 10.

As shown in FIG. 2 and FIG. 3, the first movable lens group 30 is arranged behind the lens G1 in the optical axis L2 direction, supported to be movable in the optical axis L2 direction, and driven to reciprocate in the optical axis L2 direction by the first drive unit 60.

That is, the first movable lens group 30 includes a lens holding member 31, a guided portion 32 guided by a guide shaft 61, a regulated portion 33 that is slidably engaged with an anti-rotation shaft 62 and regulated not to rotate on the optical axis L2, a U-shaped engagement portion 34 on which a nut 65 having a lead screw screwed therein abuts, and others.

As shown in FIG. 3, the lens G6 is arranged behind the second movable lens group (the image blur correction apparatus M1) in the optical axis L2 direction and fixed to the holding portion 13 of the unit case 10.

The filter 40 is, e.g., an infrared cut filter or a low-pass filter, arranged behind the lens G6 in the optical axis L2 direction, and fixed to the holding portion 14 of the unit case 10.

As shown in FIG. 3, the image pickup element 50 is arranged behind the filter 40 in the optical axis L2 direction and fixed to the holding portion 15 of the unit case 10.

As shown in FIG. 2 and FIG. 3, the first drive unit 60 includes a guide shaft 61 and an anti-rotation shaft 62 that extend in the optical axis L2 direction and are fixed to the unit case 10, a lead screw 63 extending in the optical axis L2 direction, a motor 64 driving the lead screw 63 to rotate, a nut 65 that has the lead screw 63 screwed therein and abuts on the U-shaped engagement portion 34 of the first movable lens group 30, an extension type coil spring 66 that is hooked between the lens holding member 31 and a later-described base 100 to exercise urging force for constantly urging the U-shaped engagement portion 34 toward the nut 64, and others.

As shown in FIG. 2, the second drive unit 70 includes a guide shaft 71 and an anti-rotation shaft (the anti-rotation shaft 62 is used here also) that extend in the optical axis L2 direction and are fixed to the unit case 10, a lead screw 73 that extends in the optical axis L2 direction, a motor 74 that drives the lead screw 73 to rotate, a nut 75 that has the lead screw 73 screwed therein and abuts on a U-shaped engagement portion 103 of the base 100 included in the second movable lens group, a coil spring (the coil spring 66 is used here also) that exercises urging force for constantly urging the U-shaped engagement portion 103 toward the nut 75, and others.

As shown in FIG. 3, the angular velocity sensor 80 is fixed to the unit case 10 through a substrate and configured to detect vibration or blur that the image pickup unit U undergoes.

The control unit 90 is a microcomputer fixed to an outer wall of the unit case 10 as shown in FIG. 3, and it includes a control section 91 that executes arithmetic processing and processes various kinds of signals to generate command signals, a motor drive circuit 92 that drives the motor 64 of the first drive unit 60, a motor drive circuit 93 that drives the motor 74 of the second drive unit 70, a drive circuit 94 that drives the image pickup element 50, a drive circuit 95 that drives a first coil 121 and a second coil 131 included in the image blur correction apparatus M1, a position detection circuit 96 connected to a first magnetic sensor 171 and a second magnetic sensor 172 that detect a position of a movable holding member 110 included in the image blur correction apparatus M1, an angular velocity detection circuit 97 connected to the angular velocity sensor 80, and others.

Figure 5:
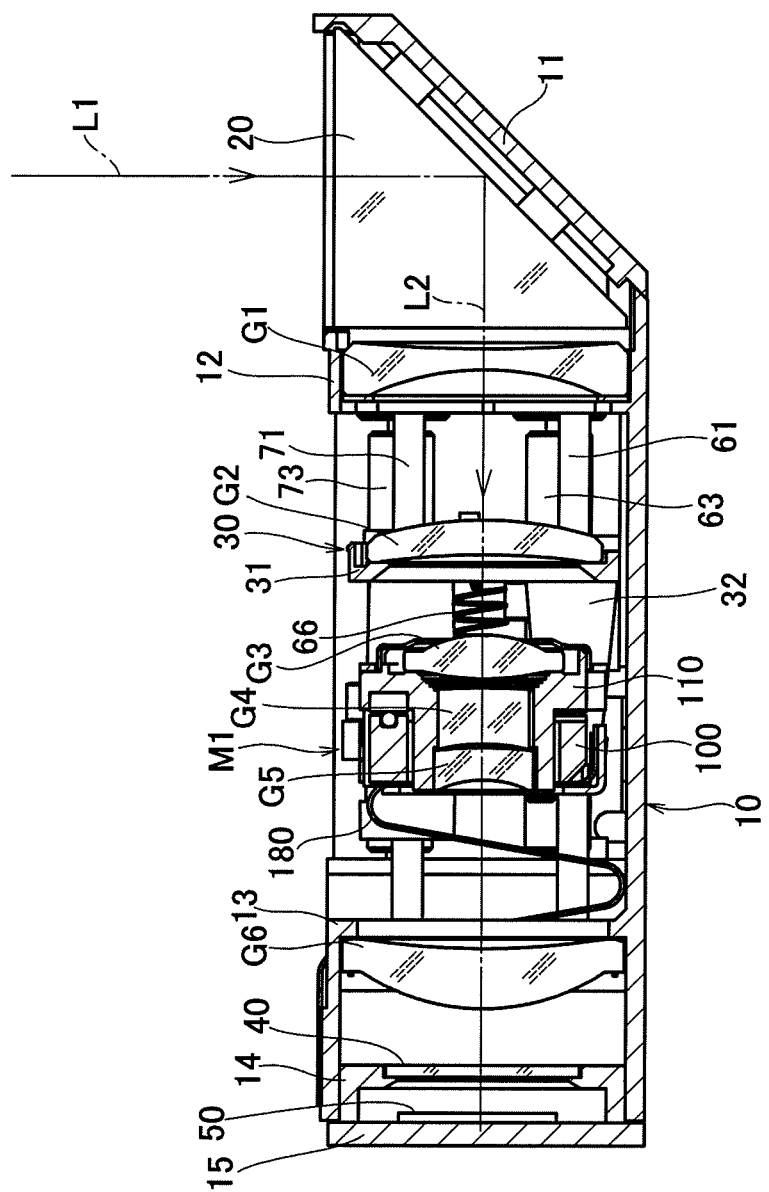
FIG. 5 is a cross-sectional view of the image pickup unit.

As shown in FIG. 2, FIG. 3, and FIG. 5, the image blur correction apparatus M1 as the second movable lens group is arranged between the first movable lens group 30 and the lens G6 in the optical axis L2 direction and supported to be movable along the optical axis L2 direction.

Further, as shown in FIG. 2 and FIG. 6 to FIG. 8, the image blur correction apparatus M1 includes a base 100, a movable holding member 110, a first drive mechanism 120 (including a first coil 121 and a first drive magnet 122) as a driving means, a second drive mechanism 130 (including a second coil 131 and a second drive magnet 132) as a driving means, yokes 141 and 142 included in the driving means, three spheres 150 as a support mechanism that supports the movable holding member 110 to be movable within a plane vertical to the optical axis L2, a first return magnet 161 and a second return magnet 162 as a returning means, a first magnetic sensor 171 and a second magnetic sensor 172 as a position detecting means, a flexible wiring board 180 that achieves electrical connection, and others.

As shown in FIG. 6 to FIG. 8 and FIG. 10 to FIG. 12, the base 100 is formed into a substantially rectangular tabular shape that is substantially flat in the optical axis L2 direction, narrow in a direction of a straight line S1 which is orthogonal to the optical axis L2 and parallel to the optical axis L1, and long in a direction of a straight line S2 which is orthogonal to the optical axis L2 and the straight line S1, and it includes an opening portion 100a formed with the optical axis L2 at the center, a fitting concave portion 100b in which the first coil 121 is fitted in fixed, a fitting concave portion 100c in which the first magnetic sensor 171 is fitted and fixed, a fitting concave portion 100d in which the first return magnet 161 is fitted and fixed, a fitting concave portion 100e in which the second coil 131 is fitted and fixed, a fitting concave portion 100f in which the second magnetic sensor 172 is fitted and fixed, a fitting concave portion 100g in which the second return magnet 162 is fitted and fixed, a guided portion 101 that is slidably engaged with and guided by the guide shaft 71, a regulated portion 102 that is slidably engaged with the anti-rotation shaft 62 to regulate its rotation around the optical axis L2, a U-shaped engagement portion 103 on which the nut 75 having the lead screw 73 screwed therein abuts, three concave portions 104 that receive the spheres 150 as a support mechanism, four coupling pins 105 coupling the movable holding member 110 movably, two screw holes 106 in which screws B for fixing the yoke 141 is screwed, and others.

That is, the base 100 is formed to define the opening portion 100a that movably receives the holding portion 110a of the movable holding member 110 and to face later-described two extending portions 111 of the movable holding member 110 in the optical axis L2 direction.

Figure 11:
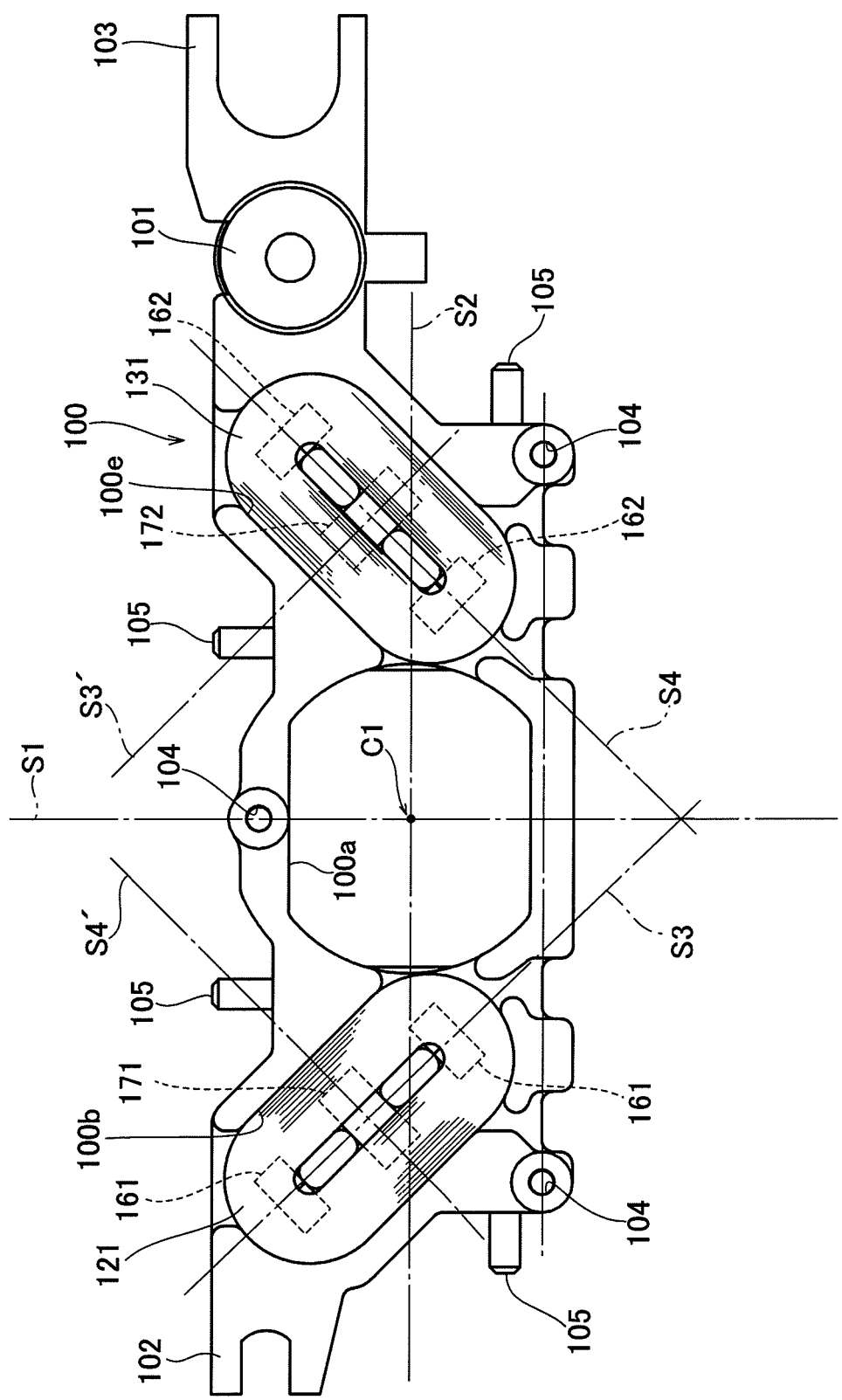
FIG. 11 is a front view showing a part (a base and others) of the image blur correction apparatus.
Figure 12:
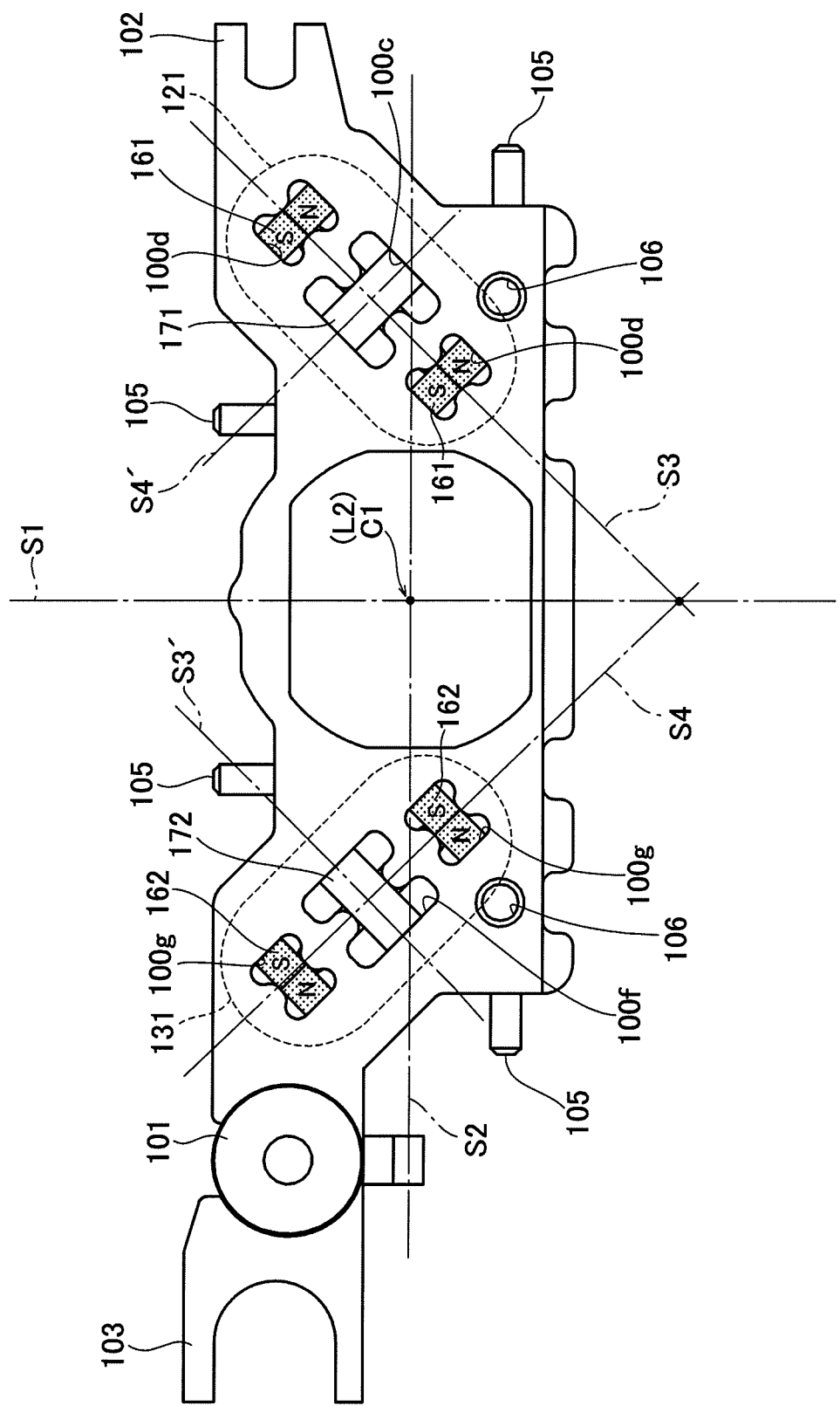
FIG. 12 is a rear view showing a part (the base and others) of the image blur correction apparatus.

As shown in FIG. 11 and FIG. 12, the opening portion 100a is formed to be narrowed in the straight line S1 direction in such a manner that the center C1 is defined at an intersection of the straight line S1 and the straight line S2 and an inner wall surface that is vertical to the direction of the straight line S1 and parallel to the straight line S2 is defined, and it is formed with an inside diameter dimension that allows the holding portion 110a of the movable holding member 110 to pass therethrough in a contactless manner within the range that the movable holding member 110 is driven.

The fitting concave portions 100b, 100c, and 100d and the fitting concave portions 100e, 100f, and 100g are formed to be line-symmetric with respect to the straight line S1 as shown in FIG. 11 and FIG. 12. That is, the first coil 121, the first return magnet 161, and the first magnetic sensor 171 and the second coil 131, the second return magnet 162, and the second magnetic sensor 172 are arranged on the base 100 to be line-symmetric with respect to the straight line S1.

The three concave portion 104 are formed to rollably receive the spheres 150 in such a manner that the spheres 150 partially protrude in the optical axis L2 direction. Moreover, in regard to the arrangement configuration of the three concave portions 104, as shown in FIG. 11, one concave portion 104 is arranged on the straight line S1 near the opening portion 100a, and the other two concave portions 104 are arranged at positions which are line-symmetric with respect to the straight line 51. That is, the three concave portions 104 are arranged to be placed at three vertexes of an isosceles triangle.

The coupling pin 105 is formed into a cylindrical shape so that it can be inserted into coupling notch portions 115 and coupling long hole portions 116 as coupling portions of the movable holding member 110. It is to be noted that the coupling pin 105 is fitted and fixed at the time of assembling.

As shown in FIG. 6 to FIG. 10, FIG. 13, and FIG. 14, the movable holding member 110 is formed into a substantially rectangular tabular shape that is substantially flat in the optical axis L2 direction except a part, narrow in the direction of the straight line S1, and long in the direction of the straight line S2, and it includes a cylindrical holding portion 110a that holds the lenses G3, G4, and G5 with the optical axis L2 at the center, two extending portions 111 extending on both sides of the straight line S2 direction to sandwich the holding portion 110a therebetween, a fitting hole 112 in which the first drive magnet 122 is fitted and fixed, a fitting hole 113 in which the second drive magnet 132 is fitted and fixed, three abutment surfaces 114 that abut on the three spheres 150 as a support mechanism, two coupling notch portions 115 and two coupling long hole portions 116 as coupling portions into which the four coupling pins 105 are inserted, respectively, two positioning protrusions 117 that position the yoke 142, and others.

The holding portion 110a is formed into a flat cylindrical shape that is narrow in the direction of the straight line S1 so as to hold the lenses G3, G4, and G5 therein, each lens having parallel cut planes obtained by partially cutting an outer periphery (cutting in parallel to the straight line S2) in the direction of the straight line S1.

Figure 10:
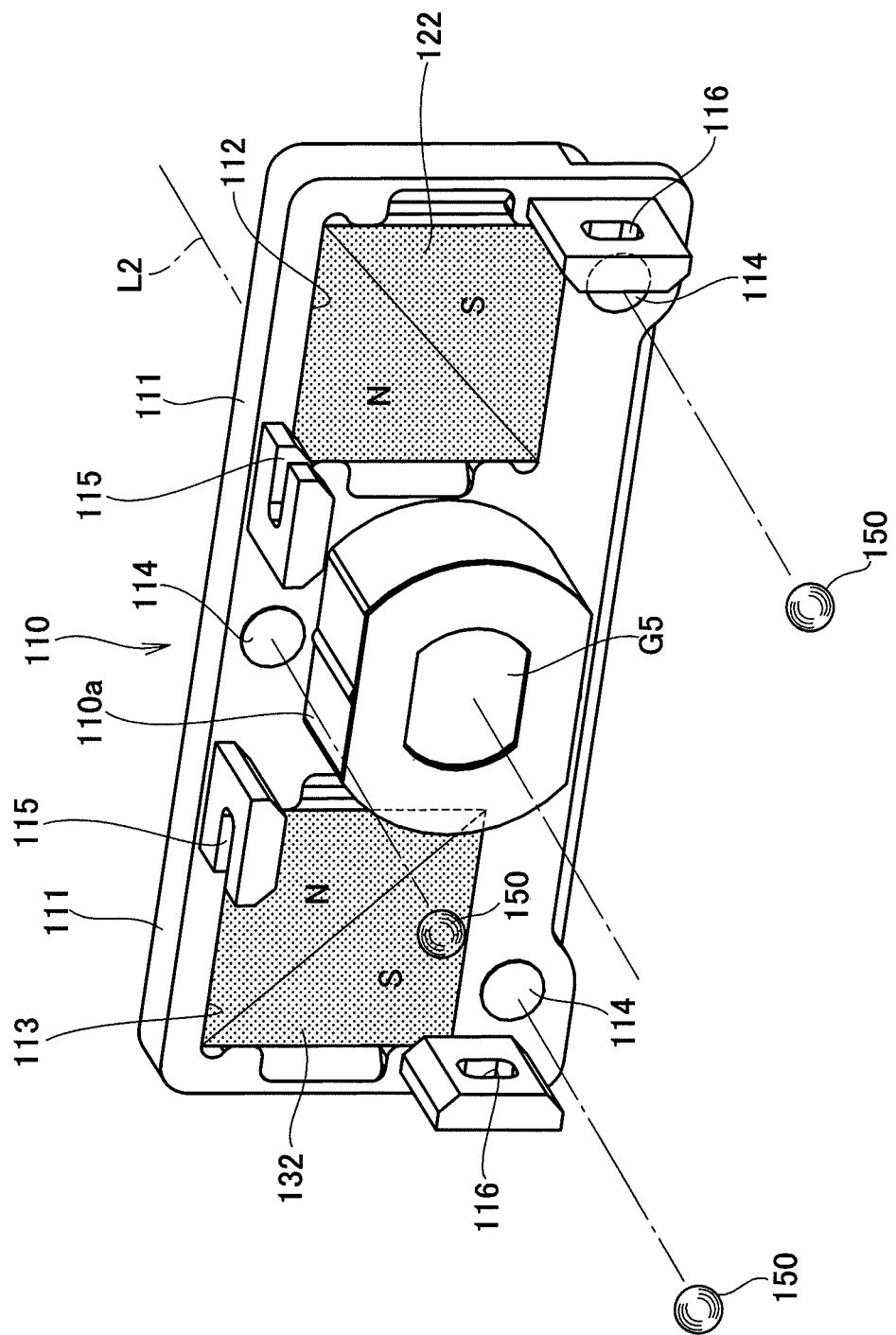
FIG. 10 is a perspective view showing a part (the movable holding member and others) of the image blur correction apparatus.

As shown in FIG. 10, the three abutment surfaces 114 are arranged to face the three concave portions 104 (the spheres 150) in the optical axis L2 direction in a state that the optical axis L2 of the lenses G3, G4, and G5 coincides with the center C1 of the opening portion 100a, and each of the abutment surfaces 114 is formed into a planar shape having a predetermined area so as not to deviate from a state contacting with each sphere 150 inserted in the corresponding concave portion 104 of the base 100 within the range that the movable holding member 110 two-dimensionally moves within a plane (a plane including the straight lines S1 and S2) vertical to the optical axis L2.

That is, one abutment surface 114 is arranged near the outer wall of the holding portion 110a on the straight line S1 to abut on one sphere 150.

Figure 9:
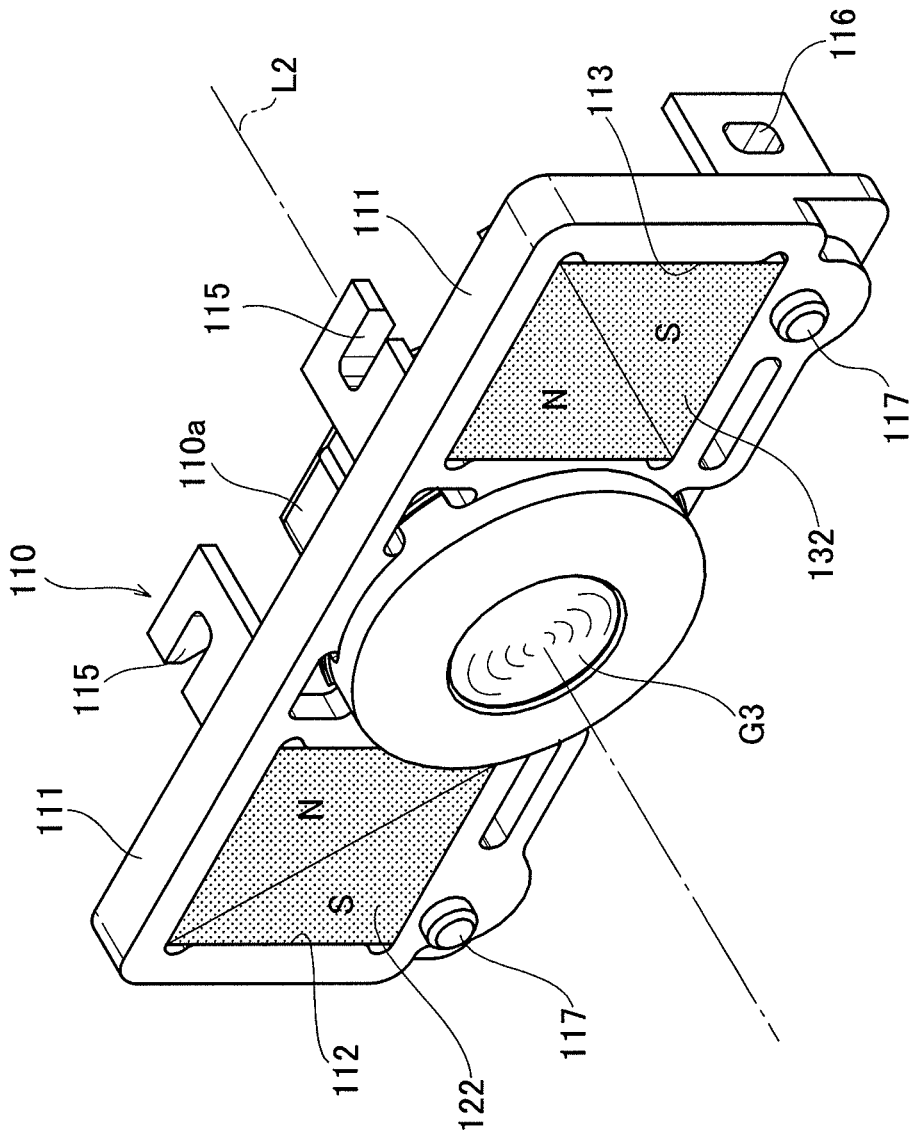
FIG. 9 is a perspective view showing a part (a movable holding member and others) of the image blur correction apparatus.
Figure 14:
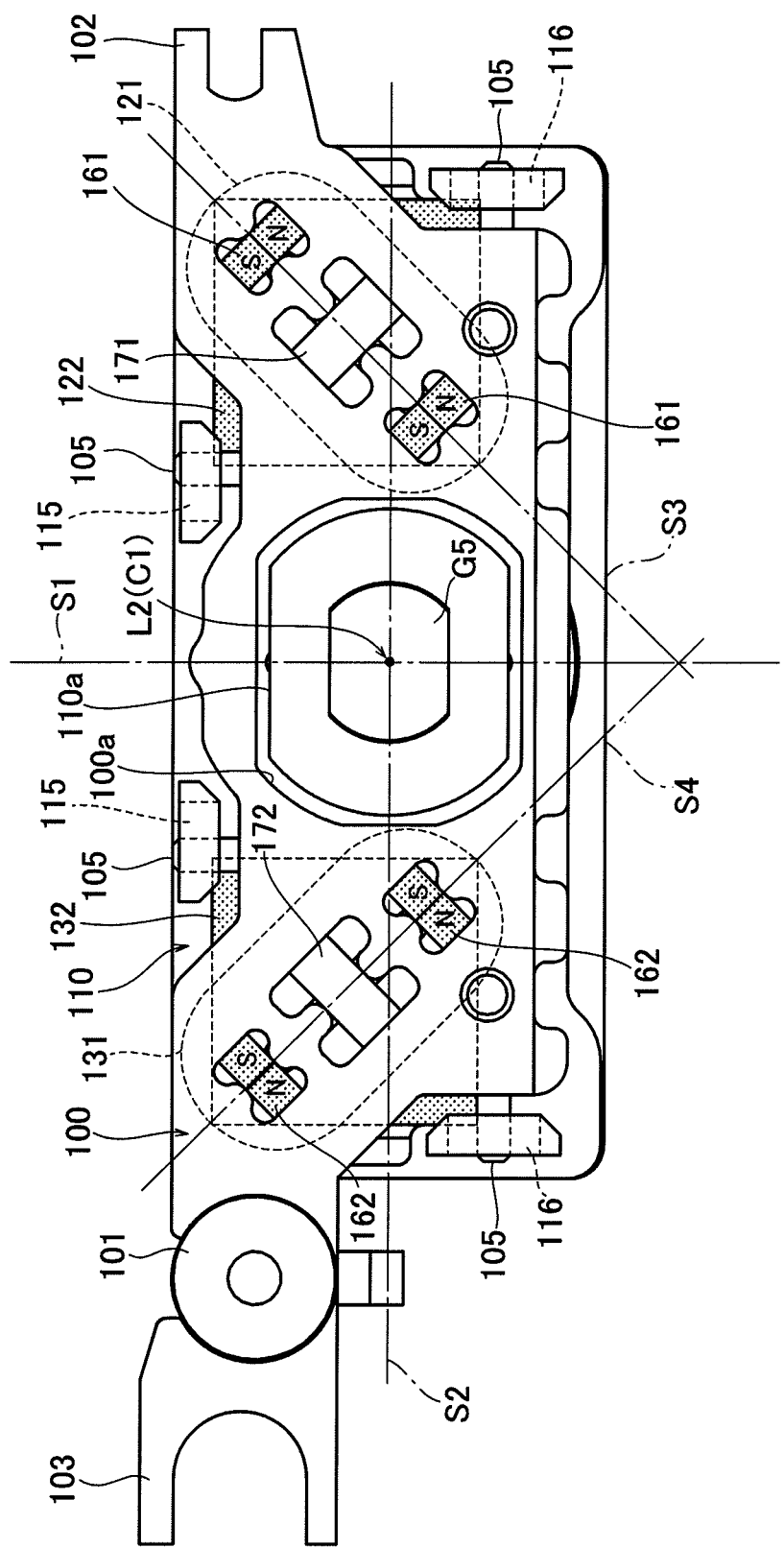
FIG. 14 is a rear view showing the image blur correction apparatus.

As shown in FIG. 9, FIG. 10, and FIG. 14, the coupling notch portion 115 is formed to extend in a direction parallel to the straight line S2 vertical to the optical axis L2 and to be opened toward the outside of the straight line S2 direction, and it is configured to slidably receive the coupling pin 105.

As shown in FIG. 10 and FIG. 14, the coupling long hole portion 116 is formed to extend in a direction parallel to the straight line S1 vertical to the optical axis L2, and it is configured to slidably receive the coupling pin 105.

Here, the support mechanism is constituted of the three concave portions 104 provided to the base 100, the three spheres 150 arranged in the three concave portions 104, and the three abutment surfaces 114 that are provided to the movable holding member 110 and abut on the spheres 150. Therefore, simplification of the structure and miniaturization of the apparatus can be achieved.

Further, as described above, the three concave portions 104 include one concave portion 104 arranged on the straight line S1 that is vertical to the optical axis L2 and runs through the center C1 of the opening portion 100a and two concave portions 104 arranged at the positions line-symmetric with respect to the straight line S1, three spheres 150 are arranged in the three concave portions 104, and the three abutment surfaces 114 are formed to abut on the three spheres 150, whereby loads applied to the spheres 150 can be arranged in a well-balanced manner while using the small number of the spheres 150 and the movable holding member 110 can be supported to allow its smooth movement.

Furthermore, the opening portion 100a of the base 100 and the holding portion 110a of the movable holding member 110 are formed to have narrow widths in the straight line S1 direction that is vertical to the optical axis L2 and runs through the center C1 of the opening portion 100a, and the one concave portion 104 (the sphere 150 and the abutment surface 114) is arranged on the straight line S1, thereby reducing a width and a size of the apparatus in the straight line S1 direction.

In particular, since one sphere 150 in the three spheres 150 is arranged near the straight line S1 direction on the outer wall of the holding portion 110a formed with a small width in the straight line S1 direction so as to fit and hold the lenses G3, G4, and G5, the apparatus can be further reduced in width and size in the straight line S1 direction.

Moreover, at the time of assembling, when the spheres 150 are inserted into the concave portions 104 and the movable holding member 110 is arranged to face the base 100 so that the abutment surfaces 114 abut on the spheres 150, the first return magnets 161 fixed to the base 100 and the first drive magnet 122 fixed to the movable holding member 110 magnetically attract each other, and the second return magnets 162 fixed to the base 100 and the second drive magnet 132 fixed to the movable holding member 110 magnetically attract each other, whereby the movable holding member 110 is supported to be movable within the plane vertical to the optical axis 12 without being separated from the base 100. Additionally, when the coupling pins 105 are inserted into the coupling notch portions 115 and the coupling long hole portions 116, separation of the movable holding member 110 from the base 100 in the optical axis L2 direction is regulated, and the movable holding member 110 is supported with respect to the base 100 to be movable within the plane (the plane including the straight lines S1 and S2) vertical to the optical axis L2.

In this state, since the movable holding member 110 is prevented from being separated from the base 100 in the optical axis L2 direction by the magnetic attractive force between the return magnets 161 and 162 and the drive magnets 122 and 132 and an engagement relationship between the coupling pins 105 and the coupling portions (the coupling notch portions 115 and the coupling long hole portions 116), extra drive force is not required as compared with a situation where the separation is avoided by using urging force of springs like conventional examples, and the movable holding member 110 is two-dimensionally moved with respect to the base 100 within the plane by the drive force of the first drive mechanism 130 and the second drive mechanism 140, thereby highly accurately correcting an image blur caused due to hand movement and others.

Here, the configuration where the coupling pins 105 are provided to the base 100 and the coupling notch portions 115 and the coupling long hole portions 116 are provided as the coupling portions to the movable holding member 110 has been explained, but the present invention is not limited thereto, and the coupling notch portions and the coupling long hole portions may be provided as the coupling portions to the base and the coupling pins may be provided to the movable holding member as a reverse pattern.

As shown in FIG. 7, FIG. 8, FIG. 13, and FIG. 14, the first drive mechanism 120 is formed as a voice coil motor including the first coil 121 and the first drive magnet 122.

As shown in FIG. 11 to FIG. 14, the first coil 121 is formed into a substantially elliptic annular shape having a major axis in a direction of a straight line S3 and a minor axis in a direction of a straight line S4' as seen from the optical axis L2 direction, and it is fitted and fixed in the fitting concave portion 100b of the base 100.

Additionally, the first coil 121 is arranged in such a manner that its major axis forms an inclination angle of 45 degrees with respect to the straight line S2 (the major axis becomes parallel to the straight line S3).

Figure 13:
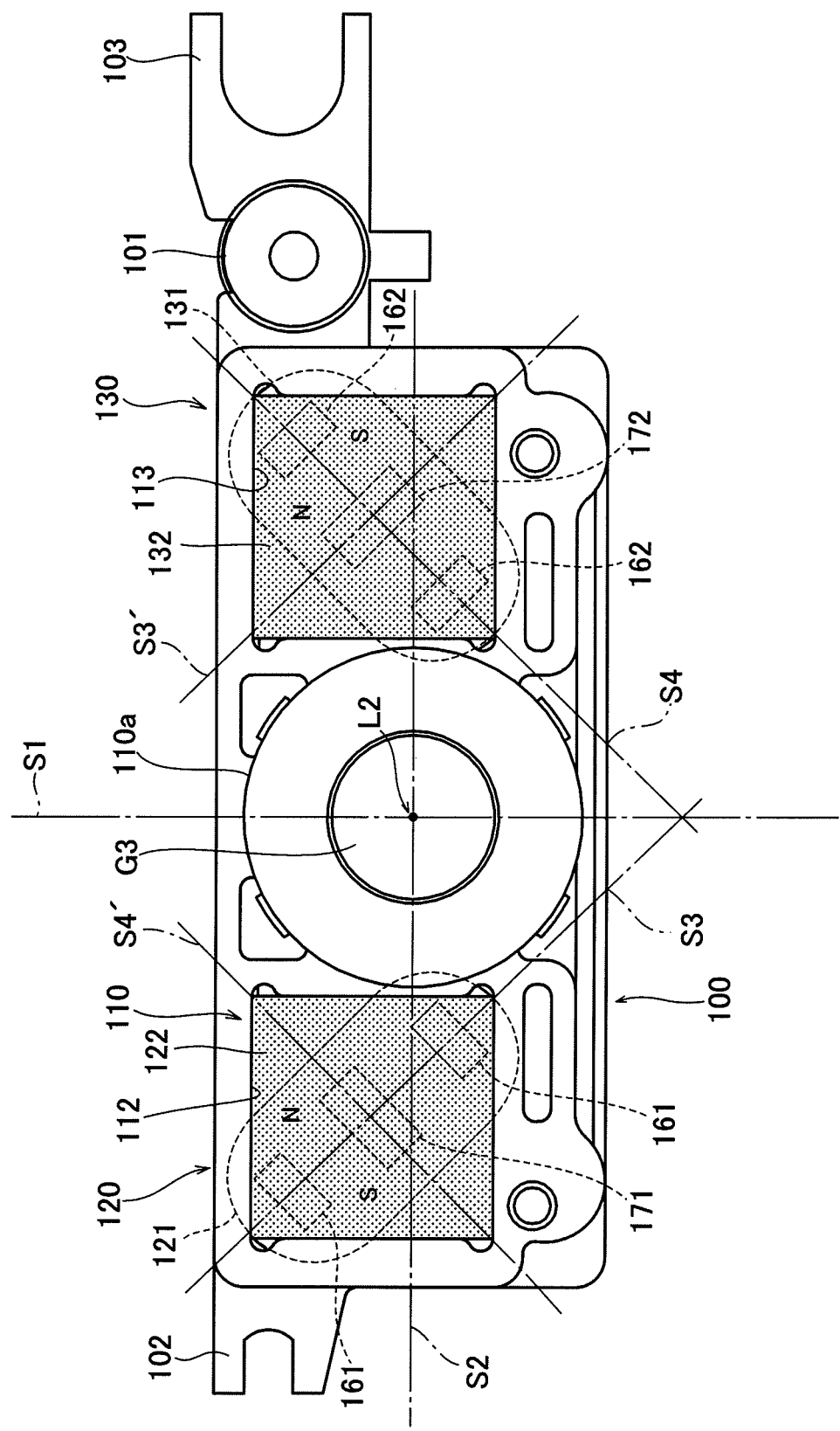
FIG. 13 is a front view showing the image blur correction apparatus.

As shown in FIG. 13 and FIG. 14, the first drive magnet 122 is formed into a rectangular shape magnetized to have the N pole and the S pole with a plane running through the straight line S3 used as a boundary, and it is fitted and fixed in the fitting hole 112 of the movable holding member 110.

Further, when the first drive mechanism 120 turns on/off energization of the first coil 121, electromagnetic drive force is generated in a first direction vertical to the optical axis L2, i.e., the direction of the straight line S4'.

As shown in FIG. 7, FIG. 8, FIG. 13, and FIG. 14, the second drive mechanism 130 is formed as a voice coil motor including the second coil 131 and the second drive magnet 132.

As shown in FIG. 11 to FIG. 14, the second coil 131 is formed into a substantially elliptic annular shape having a major axis in a direction of a straight line S4 and a minor axis in a direction of a straight line S3' as seen from the optical axis L2 direction, and it is fitted and fixed in the fitting concave portion 100e of the base 100.

Further, the second coil 131 is arranged in such a manner that its major axis forms an inclination angle of 45 degrees with respect to the straight line S2 (the major axis becomes parallel to the straight line S4).

As shown in FIG. 13 and FIG. 14, the second drive magnet 132 is formed into a rectangular shape magnetized to have the N pole and the S pole with a plane running through the straight line S4 used as a boundary, and it is fitted and fixed in the fitting hole 113 of the movable holding member 110.

Furthermore, when the second drive mechanism 130 turns on/off energization for the second coil 131, electromagnetic drive force is generated in a second direction vertical to the optical axis L2, i.e., the direction of the straight line S3'.

Figure 7:
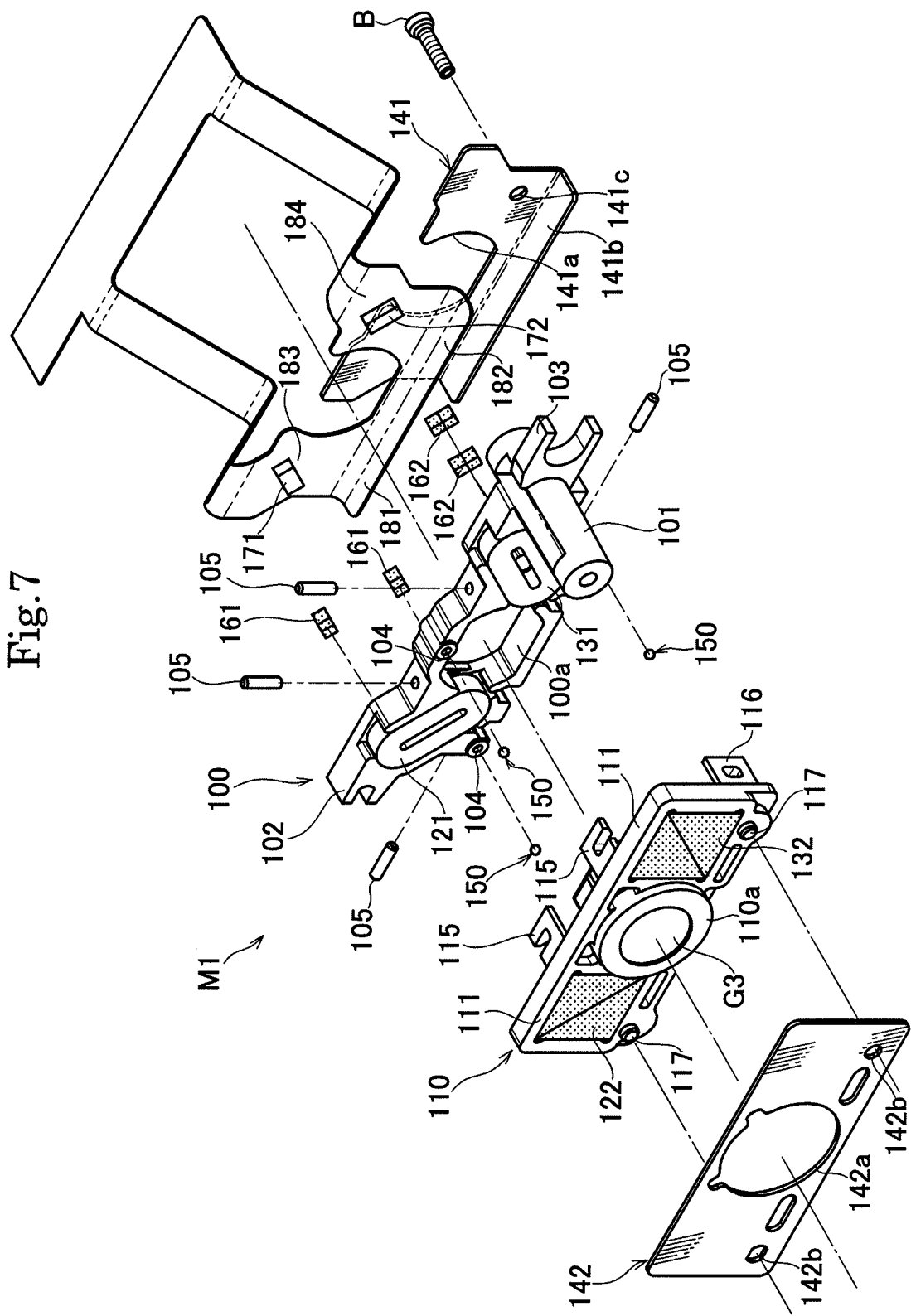
FIG. 7 is an exploded perspective view of the image blur correction apparatus.
Figure 8:
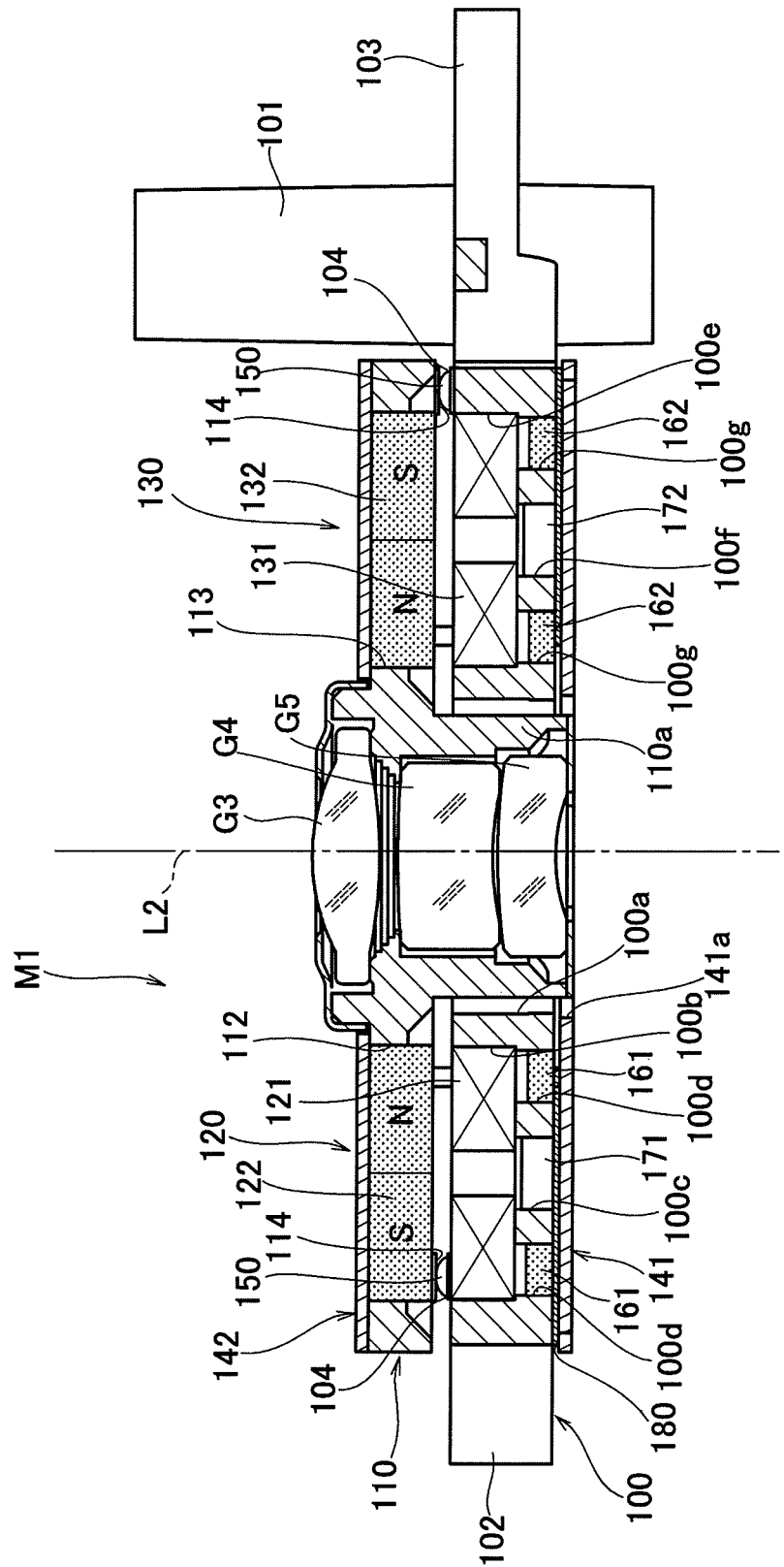
FIG. 8 is a cross-sectional view of the image blur correction apparatus.

As shown in FIG. 7 and FIG. 8, the yoke 141 is formed into a substantially rectangular plate-like shape, and it is formed to be provided with a notch portion 141a having substantially the same shape as the opening portion 100a, a bent portion 141b, and two screw holes 141c.

Figure 15:
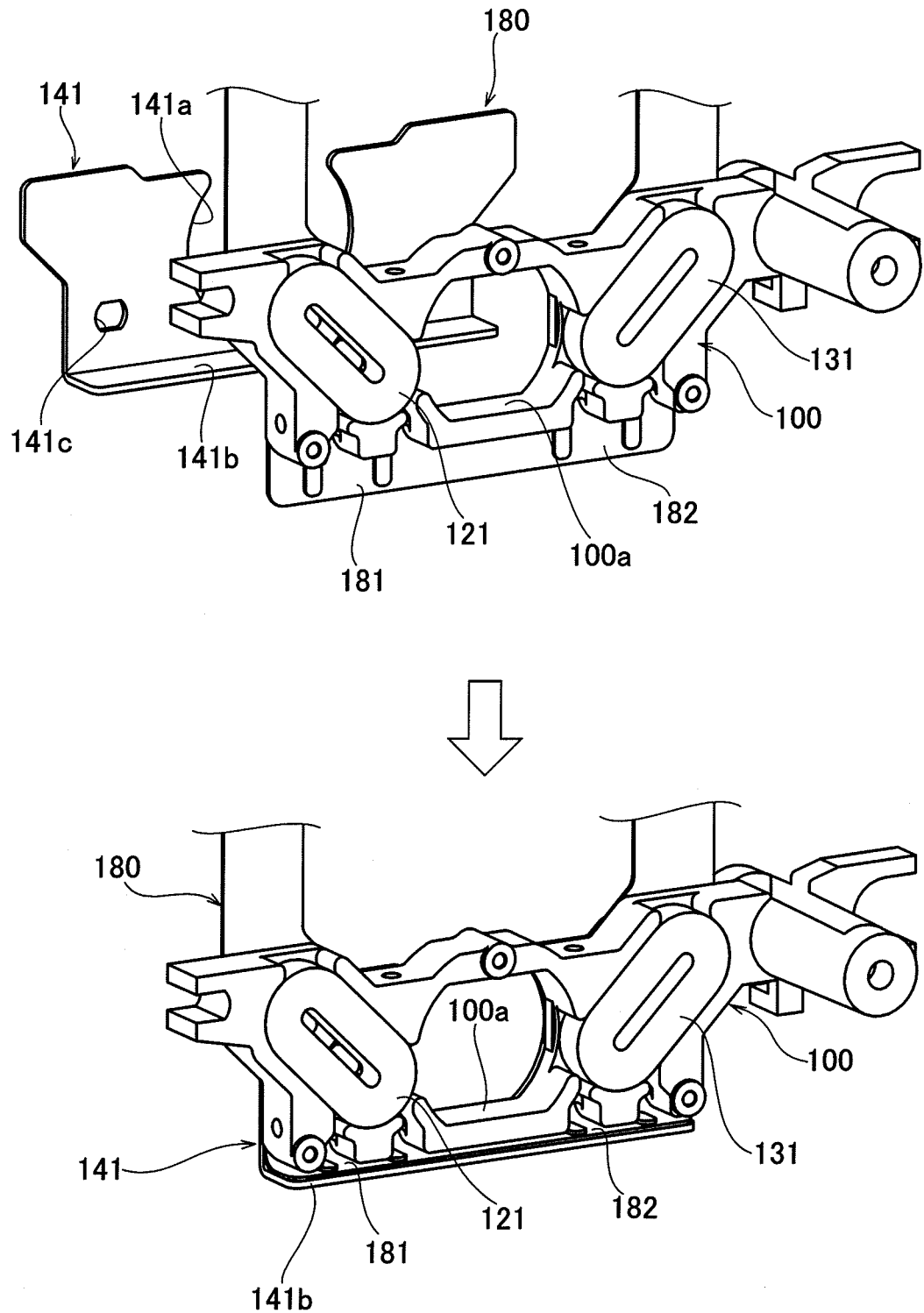
FIG. 15 is a perspective view showing a state before and after assembling when assembling a flexible wiring board and yokes to a base.

Further, as shown in FIG. 15, the yoke 141 is arranged to be adjacent to a back surface of the flexible wiring board 180 so as to sandwich, bend, and fix the flexible wiring board 180, and it is detachably fixed to the base 100 by using screws B.

Figure 6:
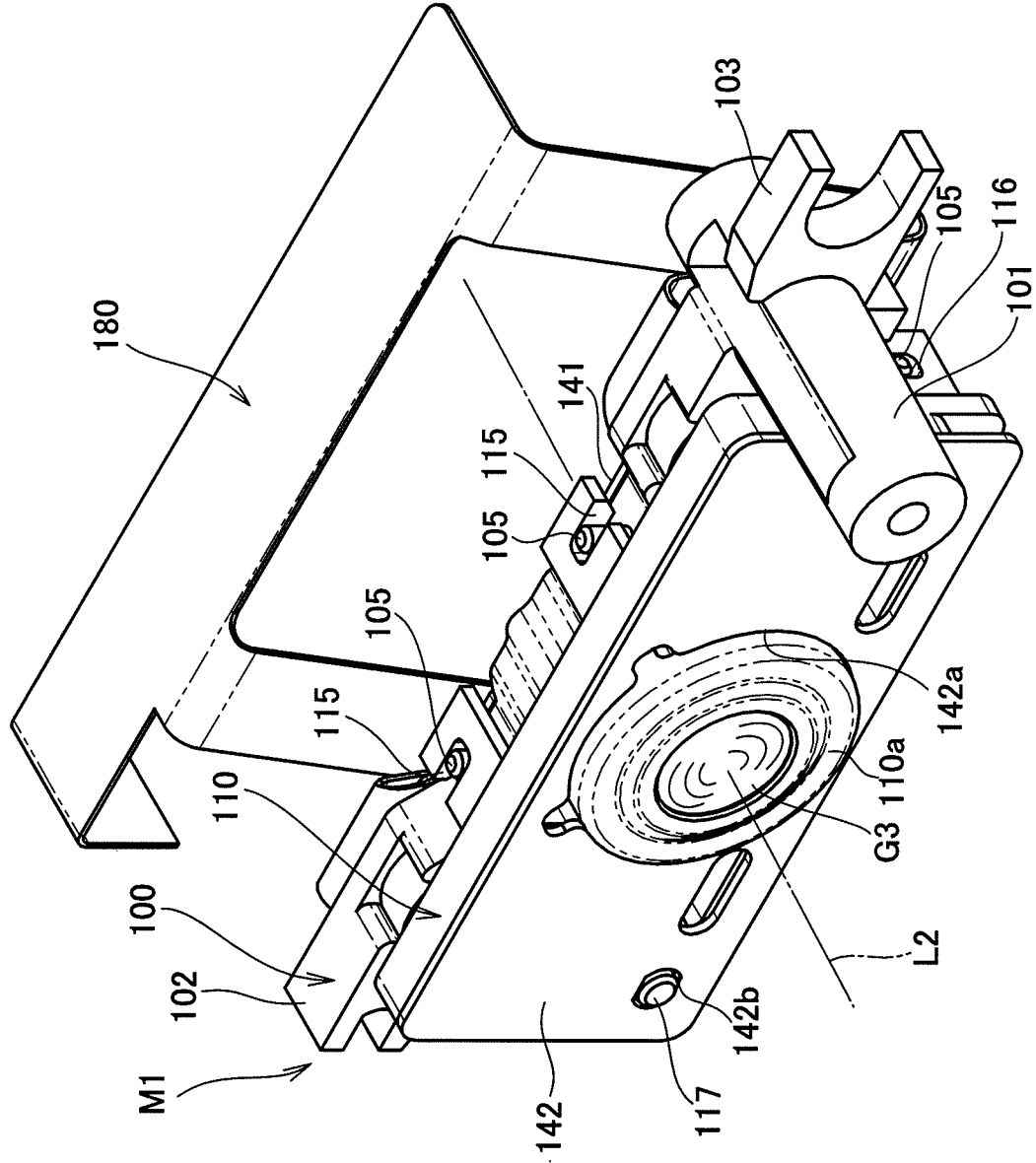
FIG. 6 is a perspective view of the image blur correction apparatus.

As shown in FIG. 6 to FIG. 8, the yoke 142 is formed into a substantially plate-like shape, and it is formed to be provided with a circular opening portion 142a that accepts the holding portion 110a and two fitting holes 142b in which the positioning protrusions 117 are fitted.

Furthermore, the yoke 142 is secured to a front surface of the movable holding member 110 (and the first drive magnet 122 and the second drive magnet 132) while fitting the positioning protrusions 117 into the fitting holes 142b by using, e.g., an adhesive.

When the yokes 141 and 142 included in a part of the driving means are provided in this manner, leakage of lines of magnetic force generated from the first drive mechanism 120 and the second drive mechanism 130 to the outside can be suppressed, thereby enhancing a magnetic efficiency.

As shown in FIG. 13, since the first drive mechanism 120 and the second drive mechanism 130 are arranged to be line-symmetric with respect to the straight line S1 orthogonal to the optical axis L2 of the lenses G3, G4, and G5 held by the movable holding member 110, drive loads received by the respective mechanisms are equal, and these mechanisms exercise drive force to both sides with the lenses G3, G4, and G5 sandwiched therebetween, whereby the movable holding member 110 can be stably and smoothly driven within the plane vertical to the optical axis L2.

Moreover, since the first coil 121 and the second coil 131 are arranged in such a manner that the major axis of each coil forms the predetermined inclination angle (substantially 45 degrees) with respect to the straight line S2, when the first coil 121 and the second coil 131 are inclined in a case that the movable holding member 110 is elongated in the direction of the straight line S2, a dimension of the movable holding member 110 can be reduced in the direction of the straight line S1, thereby achieving a reduction in size and thickness of the apparatus in the direction vertical to the optical axis L2 (in the direction of the straight line S1).

As shown in FIG. 8 and FIG. 12, the first return magnets 161 are formed into a substantially rectangular shape as seen from the optical axis L2 direction, magnetized to have the S pole and the N pole with the plane running through the straight line S3 being used as a boundary, and fitted and fixed in the two fitting concave portions 100d of the base 100 so as to sandwich the first magnetic sensor 171 in the direction of the straight line S3.

That is, the two first return magnets 161 form an inclination angle of 45 degrees with respect to the straight line S2 to be substantially parallel to the major axis of the first coil 121, and are aligned on the straight line S3.

Further, the first return magnets 161 face the first drive magnet 122 to form a magnetic path, exercise magnetic action, return the movable holding member 110 to a predetermined pause position (a position at which the optical axis L2 of the lenses G3, G4, and G5 coincides with the center C1 of the opening portion 100a of the base 100 in this example) in a pause state that the first coil 121 is not energized, and generate stable holding force.

As shown in FIG. 8 and FIG. 12, the second return magnets 162 are formed into a substantially rectangular shape as seen from the optical axis L2 direction, magnetized to have the S pole and the N pole with the plane running through the straight line S4 being used as a boundary, and fitted and fixed in the two fitting concave portions 100g of the base 100 so as to sandwich the second magnetic sensor 172 in the direction of the straight line S4.

That is, the two second return magnets 162 form an inclination angle of 45 degrees with respect to the straight line S2 to be substantially parallel to the major axis of the second coil 131, and are aligned on the straight line S4.

Further, the second return magnets 161 face the second drive magnet 132 to form a magnetic path, exercise magnetic action, return the movable holding member 110 to the predetermined pause position (the position at which the optical axis L2 of the lenses G3, G4, and G5 coincides with the center C1 of the opening portion 100a of the base 100 in this example) in a pause state that the second coil 131 is not energized, and generate stable holding force.

As described above, in the pause state, the movable holding member 110 (the lenses G3, G4, and G5) is automatically returned to and stably held at the predetermined pause position (the position at which the optical axis L2 of the lenses G3, G4, and G5 coincides with the center C1 of the opening portion 100a of the base 100) by the magnetic attracting action between the first return magnets 161 and the second return magnets 162 as the returning means and the first drive magnet 122 and the second drive magnet 132 as the driving means. Therefore, drive control, e.g., initialization is not required at the time of driving, and shakiness and others of the movable holding member 110 can be avoided at the time of driving. Moreover, since the first drive magnet 122 and the second drive magnet 132 as the driving means are used for the mutual interaction with the first return magnets 161 and the second return magnets 162 as the returning means, simplification of the structure, miniaturization of the apparatus, and others can be achieved.

Additionally, the two first return magnets 161 are arranged in such a manner that their alignment direction becomes substantially parallel to the major axis of the first coil 121, and the two second return magnets 162 are arranged in such a manner that their alignment direction becomes substantially parallel to the major axis of the second coil 131. Therefore, at the time of driving (energization for the first coil 121 and the second coil 131), force that suppresses rotation of the movable holding member 110 on the optical axis L2 is exerted by the mutual interaction of the magnetic force of the return magnets 161 and 162 and the magnetic force of the drive magnets 122 and 132, a large moment that suppresses rotation of the movable holding member 110 on the optical axis L2 can be obtained since the return magnets 161 and 162 are aligned in a direction of a magnetization boundary, and the movable holding member 110 can be rapidly moved within the plane vertical to the optical axis L2 to be highly accurately positioned at a desired position.

Each of the first magnetic sensor 171 and the second magnetic 172 is, e.g., a hall element that detects a change in magnetic flux density and outputs this change as an electric signal, and it is fitted and fixed in the fitting concave portion 100c or 100f of the base 100 (see FIG. 12) as shown in FIG. 8 and FIG. 11 to FIG. 14. Here, in the movement range of the movable holding member 110, the first magnetic sensor 171 is arranged at a position where it faces the first drive magnet 122, and the second magnetic sensor 172 is arranged at a position where it faces the second drive magnet 132.

Additionally, the first magnetic sensor 171 forms a magnetic circuit between itself and the first drive magnet 122 fixed to the movable holding member 110, detects a change in magnetic flux density caused due to relative movement of the movable holding member 110 with respect to the base 100, and thereby detects a position of the movable holding member 110.

Further, the second magnetic sensor 172 forms a magnetic circuit between itself and the second drive magnet 132 fixed to the movable holding member 110, detects a change in magnetic flux density caused due to relative movement of the movable holding member 110 with respect to the base 100, and thereby detects a position of the movable holding member 110.

Since the first magnetic sensor 171 and the second magnetic sensor 172 are fixed to the base 100 in this manner, wiring is easier than that in a situation where these sensors are provided to the movable holding member 110, disconnection and the like involved by movement can be avoided, and simplification of the structure, a reduction in number of components, miniaturization of the apparatus, and others can be achieved as compared with a situation where dedicated magnets are provided since the first drive magnet 122 and the second drive magnet 132 are also used for positional detection.

As shown in FIG. 7, the flexible wiring board 180 is formed to have a connecting portion 181 connected to the first coil 121 of the first drive mechanism 120, a connecting portion 182 connected to the second coil 131 of the second drive mechanism 130, a connecting portion 183 connected to the first magnetic sensor 171, and a connecting portion 184 connected to the second magnetic sensor 172.

Furthermore, as shown in FIG. 15, the flexible wiring board 180 is arranged in contact with the back surface of the base 100, a leading line of the first coil 121 is connected to the connecting portion 181, a leading line of the second coil 131 is connected to the connecting portion 183, a terminal of the first magnetic sensor 171 is connected to the connecting portion 183, a terminal of the second magnetic sensor 172 is connected to the connecting portion 184, and sandwiched and fixed with regions of the connecting portions 181 and 182 being bent by the yoke 141.

Since the flexible wiring board 180 is arranged and fixed with respect to the base 100, which does not move in a plane direction vertical to the optical axis L2, to be adjacent to the side of the base 100 opposite to the side of the base facing the movable holding member 110 as described above, the flexible wiring board 180 does not have to be moved in the plane direction vertical to the optical axis L2, and it does not have to be arranged while bending in the plane direction along which the movable holding member 110 moves.

Therefore, an arrangement space of the flexible wiring board 180 can be reduced, and hence the apparatus can be miniaturized, thus improving the durability.

A correcting operation of the image blur correction apparatus M1 will now be briefly explained with reference to FIG. 16A to FIG. 17C.

Figure 16A:
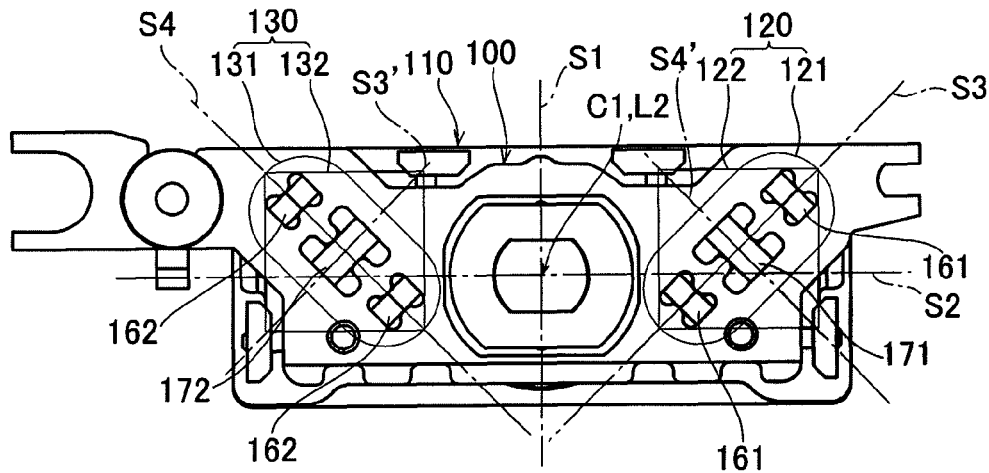
FIG. 16A is a plan view for explaining an operation of the image blur correction apparatus.

First, in the pause state that the first coil 121 and the second coil 131 are not energized, as shown in FIG. 16A, the movable holding member 110 is returned (centered) to and held at the pause position at which the optical axis L2 of the lenses G3, G4, and G5 coincides with the center C1 of the opening portion 100a by a return action of the returning means (the first return magnets 161 and the second return magnets 162).

Figure 16B:
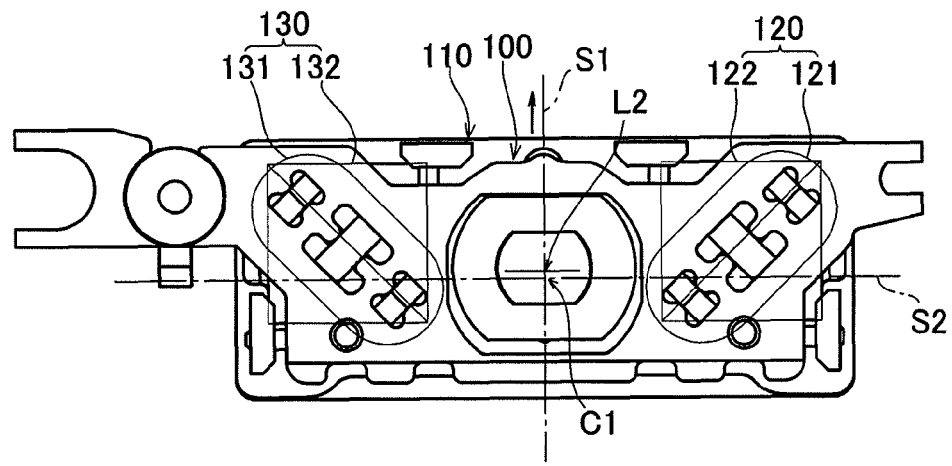
FIG. 16B is a plan view for explaining the operation of the image blur correction apparatus.

Furthermore, for example, when upwardly shifting the movable holding member 110 (the lenses G3, G4, and G5) from the pause state depicted in FIG. 16A, drive force is generated in an obliquely upward direction of the first direction (the direction of the straight line S4') by the first drive mechanism 120, and drive force is generated in an obliquely upward direction of the second direction (the direction of the straight line S3') by the second drive mechanism 130. As a result, the movable holding member 110 is moved upward in the direction of the straight light S1 as shown in FIG. 16B.

Figure 16C:
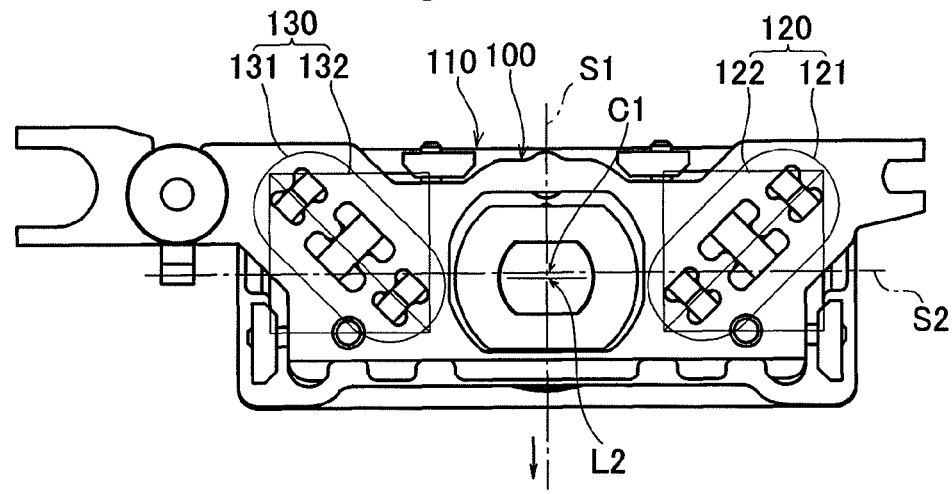
FIG. 16C is a plan view for explaining the operation of the image blur correction apparatus.

Moreover, for example, when downwardly shifting the movable holding member 110 (the lenses G3, G4, and G5) from the pause state depicted in FIG. 16A, drive force is generated in an obliquely downward direction of the first direction (the direction of the straight line S4') by the first drive mechanism 120, and drive force is generated in an obliquely downward direction of the second direction (the direction of the straight line S3') by the second drive mechanism 130. As a result, the movable holding member 110 is moved downward in the direction of the straight light S1 as shown in FIG. 16C.

Figure 17A:
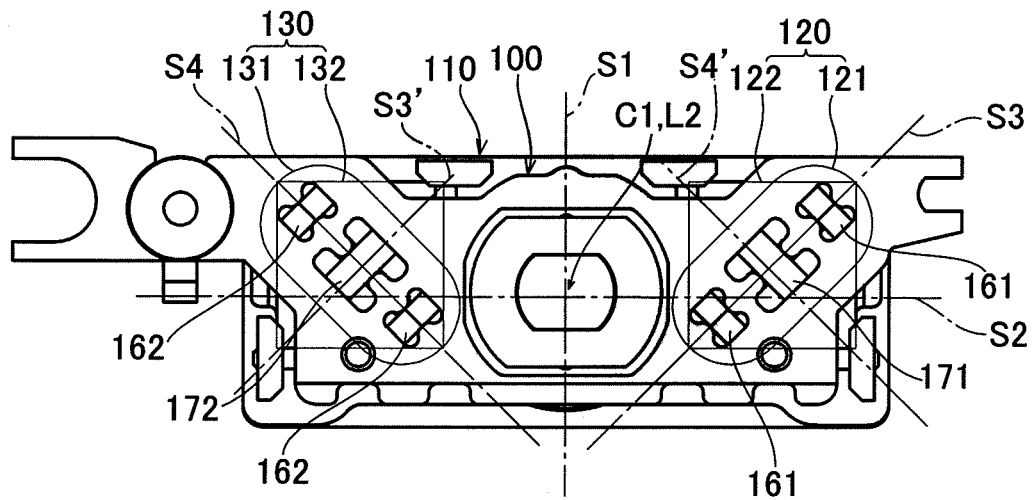
FIG. 17A is a plan view for explaining an operation of the image blur correction apparatus.
Figure 17B:
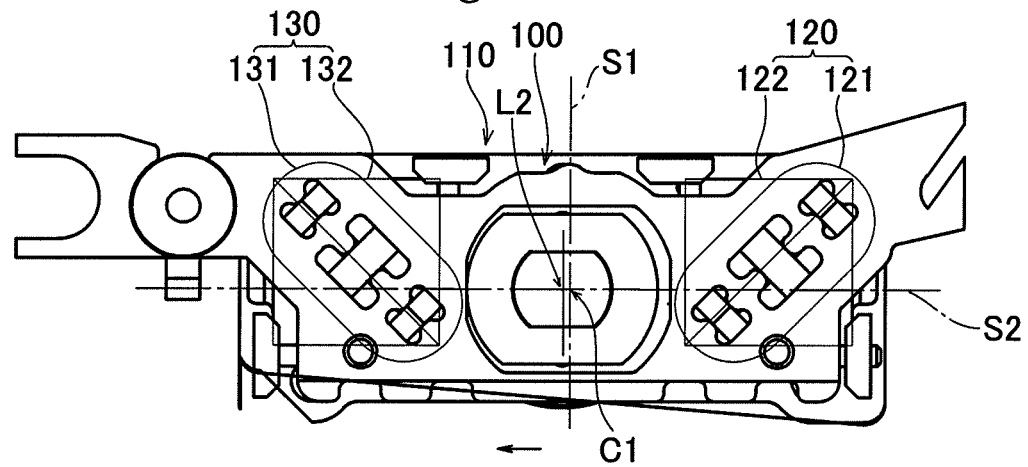
FIG. 17B is a plan view for explaining the operation of the image blur correction apparatus.

Subsequently, as shown in FIG. 17A, for example, when shifting the movable holding member 110 (the lenses G3, G4, and G5) toward the left side from the pause state that the movable holding member 110 has returned to the pause position at which the optical axis L2 of the lenses G3, G4, and G5 coincides with the center C1 of the opening portion 100a of the base 100 by the return action of the returning means (the first return magnets 161 and the second return magnets 162), the drive force is generated in the obliquely upward direction of the first direction (the direction of the straight line S4') by the first drive mechanism 120, and the drive force is generated in the obliquely downward direction of the second direction (the direction of the straight line S3') by the second drive mechanism 130. As a result, the movable holding member 110 is moved toward the left side in the direction of the straight line S2 as shown in FIG. 17B.

Figure 17C:
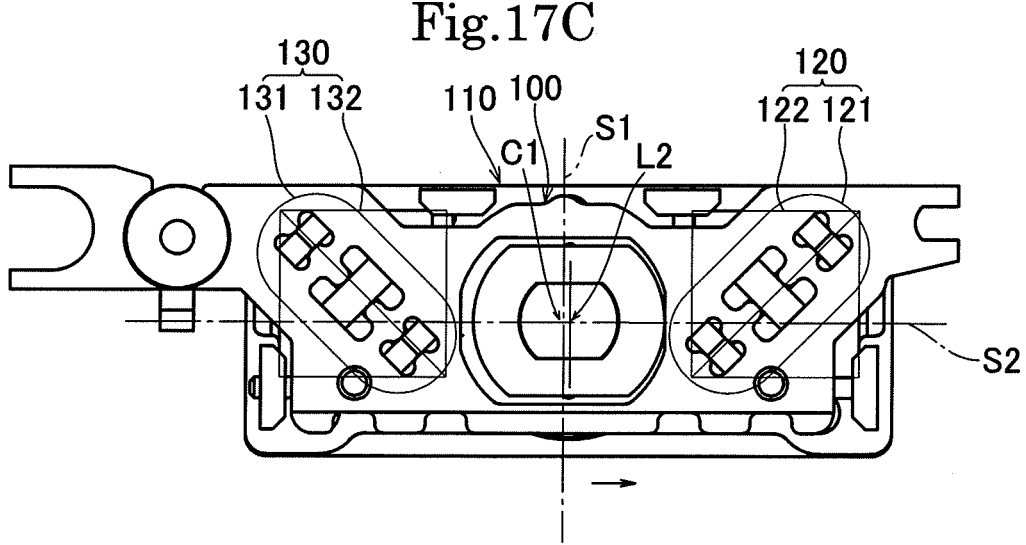
FIG. 17C is a plan view for explaining the operation of the image blur correction apparatus.

Additionally, for example, when shifting the movable holding member 110 (the lenses G3, G4, and G5) toward the right side from the pause state depicted in FIG. 17A, the drive force is generated in the obliquely downward direction of the first direction (the direction of the straight line S4') by the first drive mechanism 120, and the drive force is generated in the obliquely upward direction of the second direction (the direction of the straight line S3') by the second drive mechanism 130. As a result, the movable holding member 110 can be moved toward the right side in the direction of the straight line S2 as depicted in FIG. 17C.

As described above, in a state that the movable holding member 110 is movably supported by the support mechanism (the three spheres 150), the movable holding member 110 is two-dimensionally moved with respect to the base 100 within the plane vertical to the optical axis L2 by electromagnetic drive force generated in cooperation with the first drive magnet 122 and the second drive magnet 132 based on energization for the first coil 121 and the second coil 131, thereby highly accurately correcting an image blur caused due to hand movement and the like.

Here, the first coil 121 and the two first return magnets 161 are aligned in such a manner that the major axis of the first coil 121 and the alignment direction of the first return magnets 161 extend in the same direction, and the second coil 131 and the two second return magnets 162 are aligned in such a manner that the major axis of the second coil 131 and the alignment direction of the second return magnets 162 extend in the same direction. Therefore, at the time of driving (at the time of energizing the first coil 121 and the second coil 131), force that suppresses rotation of the movable holding member 110 on the optical axis L2 is exercised by mutual interaction of the magnetic force of the return magnets 161 and 162 and the magnetic force of the drive magnets 122 and 132, and a large moment that suppresses rotation of the movable holding member 110 on the optical axis L2 can be obtained since the return magnets 161 and 162 are aligned in a direction of a magnetization boundary, and the movable holding member 110 can be rapidly moved within the plane vertical to the optical axis L2 and highly accurately positioned to a desired position.

Another embodiment of an image blur correction apparatus according to the present invention will now be described with reference to FIG. 18 to FIG. 28. It is to be noted that like reference numerals denote structures equal to those in the foregoing embodiment, thereby omitting a description thereof.

Figure 4:
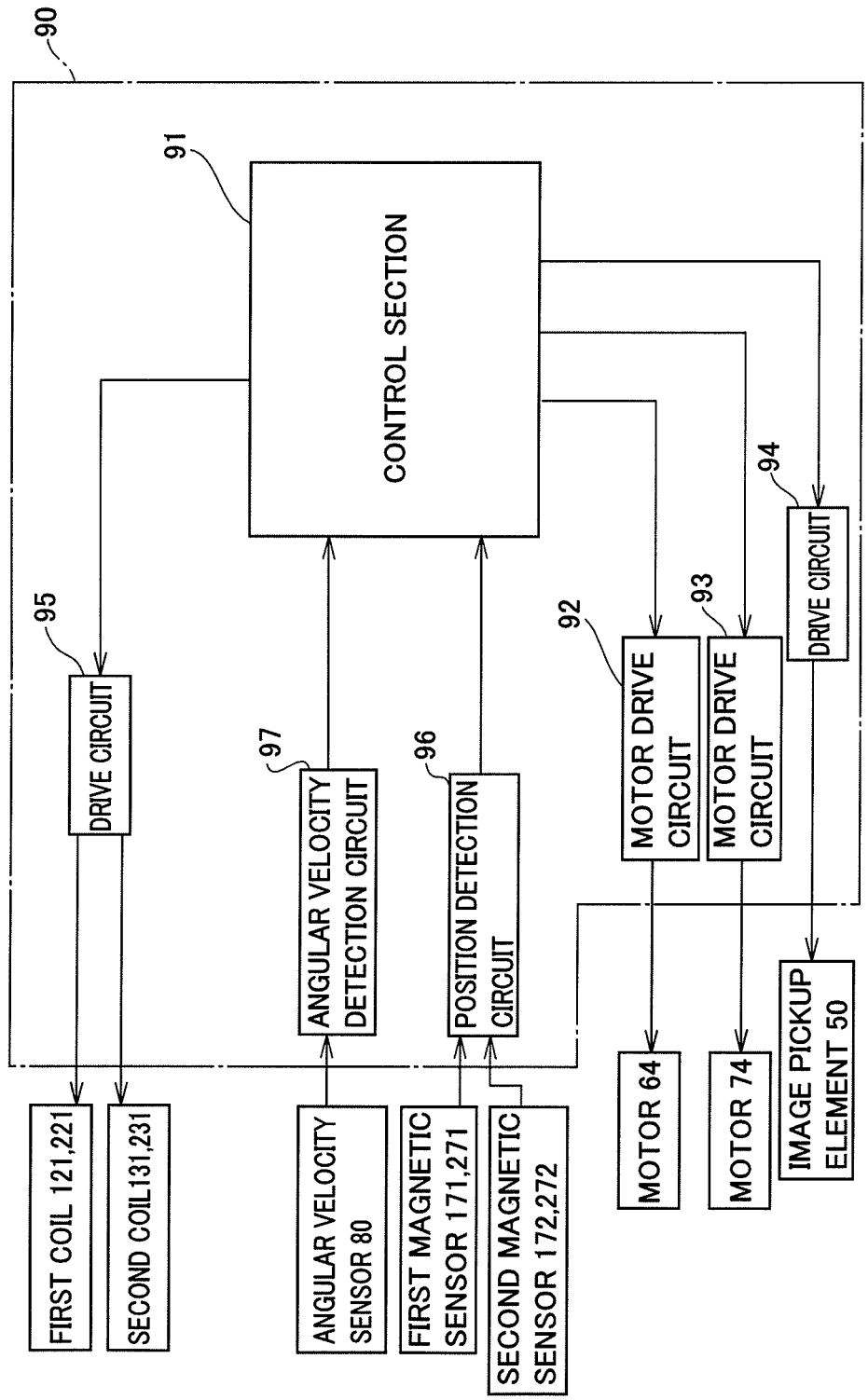
FIG. 4 is a block diagram showing a control system of the image blur correction apparatus.
Figure 18:
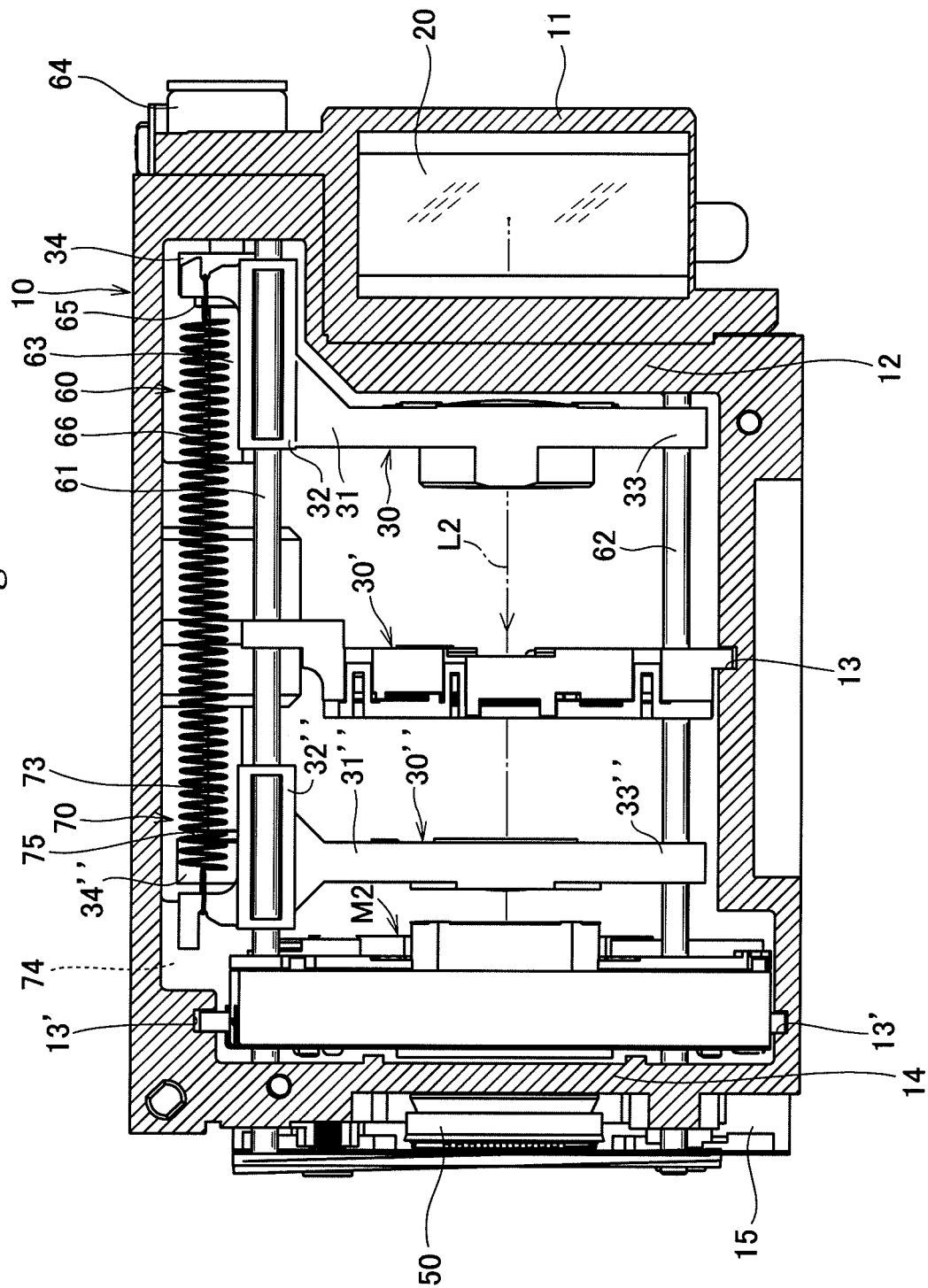
FIG. 18 is a plan view of another embodiment of an image blur correction apparatus, showing the inside of an image pickup unit having this image blur correction apparatus incorporated therein.
Figure 19:
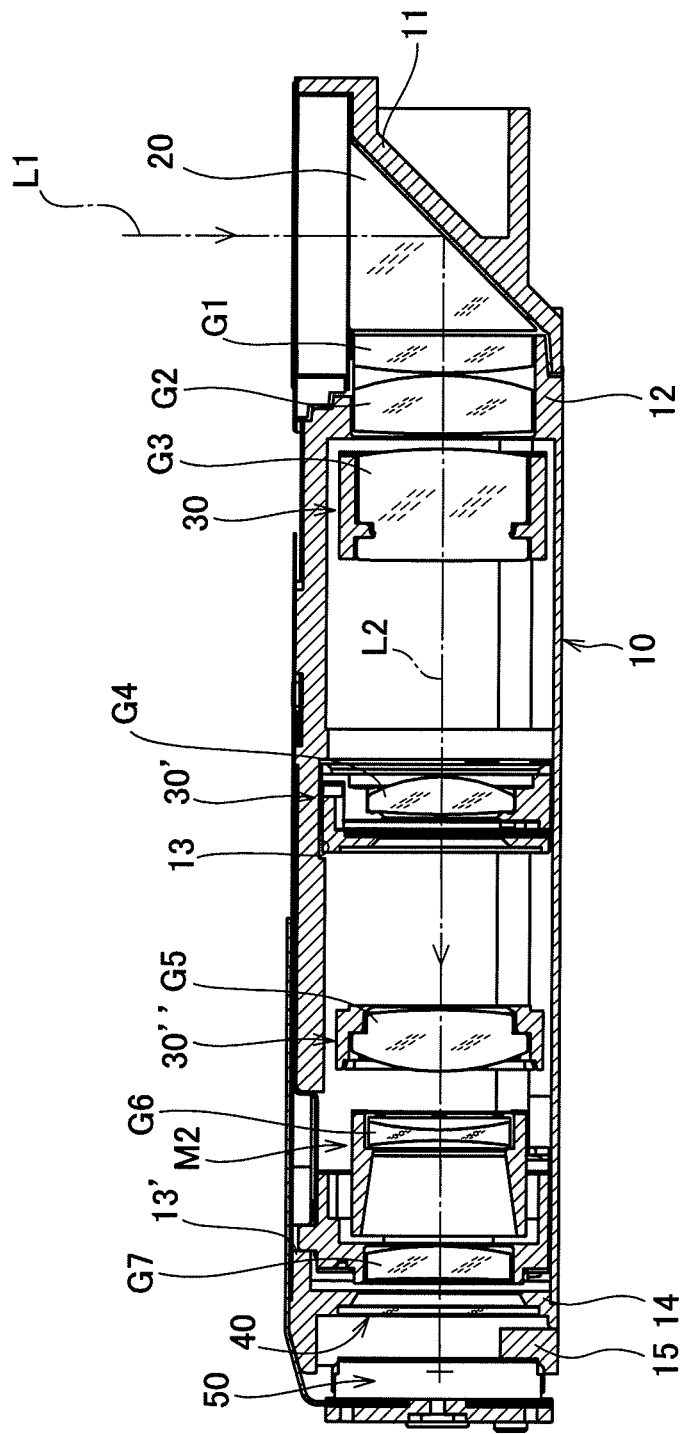
FIG. 19 is a cross-sectional side view showing the inside of the image pickup unit depicted in FIG. 18.

As shown in FIG. 18 and FIG. 19, an image pickup unit U having this image blur correction apparatus M2 incorporated therein includes a unit case 10, a prism 20, lenses G1 and G2, a first movable lens group 30 holding a lens G3, a second fixed lens group 30' holding a lens G4, a third movable lens group 30" holding a lens G5, an image blur correction apparatus M2 as a fourth fixed lens group holding lenses G6 and G7, a filter 40, an image pickup element 50, a first drive unit 60 configured to drive the first movable lens group 30 in an optical axis L2 direction, a second drive unit 70 configured to drive the third movable lens group 30" in the optical axis L2 direction, an angular velocity sensor 80, a control unit 90 (see FIG. 4), and others. It is to be noted that the filter 40 may not be required depending on the image pickup element 50 and image pickup processing means.

As shown in FIG. 18 and FIG. 19, the second fixed lens group 30' is arranged behind the first movable lens group 30 in the optical axis L2 direction, holds the lens G4, and is fixed to a holding portion 13 of the unit case 10 so as to be immovable in the optical axis L2 direction.

As shown in FIG. 18 and FIG. 19, the third movable lens group 30" is arranged behind the second fixed lens group 30' in the optical axis L2 direction, holds the lens G5, is supported to be movable in the optical axis L2 direction, and reciprocated in the optical axis L2 direction by the second drive unit 70. That is, the third movable lens group 30" includes a lens holding member 31", a guided portion 32" guided by a guide shaft 61, a regulated portion 33" that is slidably engaged with an anti-rotation shaft 62 to regulate its rotation on the optical axis L2, a U-shaped engagement portion 34" on which a nut 75 having a lead screw 73 screwed therein abuts on, and others.

As shown in FIG. 18 and FIG. 19, the fourth fixed lens group (an image blur correction apparatus M2) is arranged behind the third movable lens group 30" in the optical axis L2 direction, holds the lenses G6 and G7, and is fixed to a holding portion 13' of the unit case 10 so as to be immovable in the optical axis L2 direction.

As shown in FIG. 18 and FIG. 20 to FIG. 22, the image blur correction apparatus M2 as the fourth fixed lens group includes a base 200, a movable holding member 210, a first drive mechanism 220 (including first coils 221 and first drive magnets 222) as a driving means, a second drive mechanism 230 (including a second coil 231 and a second drive magnet 232) as a driving means, four spheres 250 as a support mechanism supporting the movable holding member 210 to be movable within a plane vertical to the optical axis L2, first return magnets 261 and a second return magnet 262 as a returning means, first magnetic sensors 271 and a second magnetic sensor 272 as a position detecting means, a flexible wiring board 280 achieving electrical connection, and others.

As shown in FIG. 20 to FIG. 24, the base 200 is constituted of a substantially rectangular case-like base 201 that is substantially flat in the optical axis L2 direction, narrow in a direction of a straight line S1 orthogonal to the optical axis L2 and parallel to an optical axis L1, and long in a direction of a straight line S2 orthogonal to the optical axis L2 and the straight line S1, and a cover-like base 202 detachably coupled with the case-like base 201.

Figure 22:
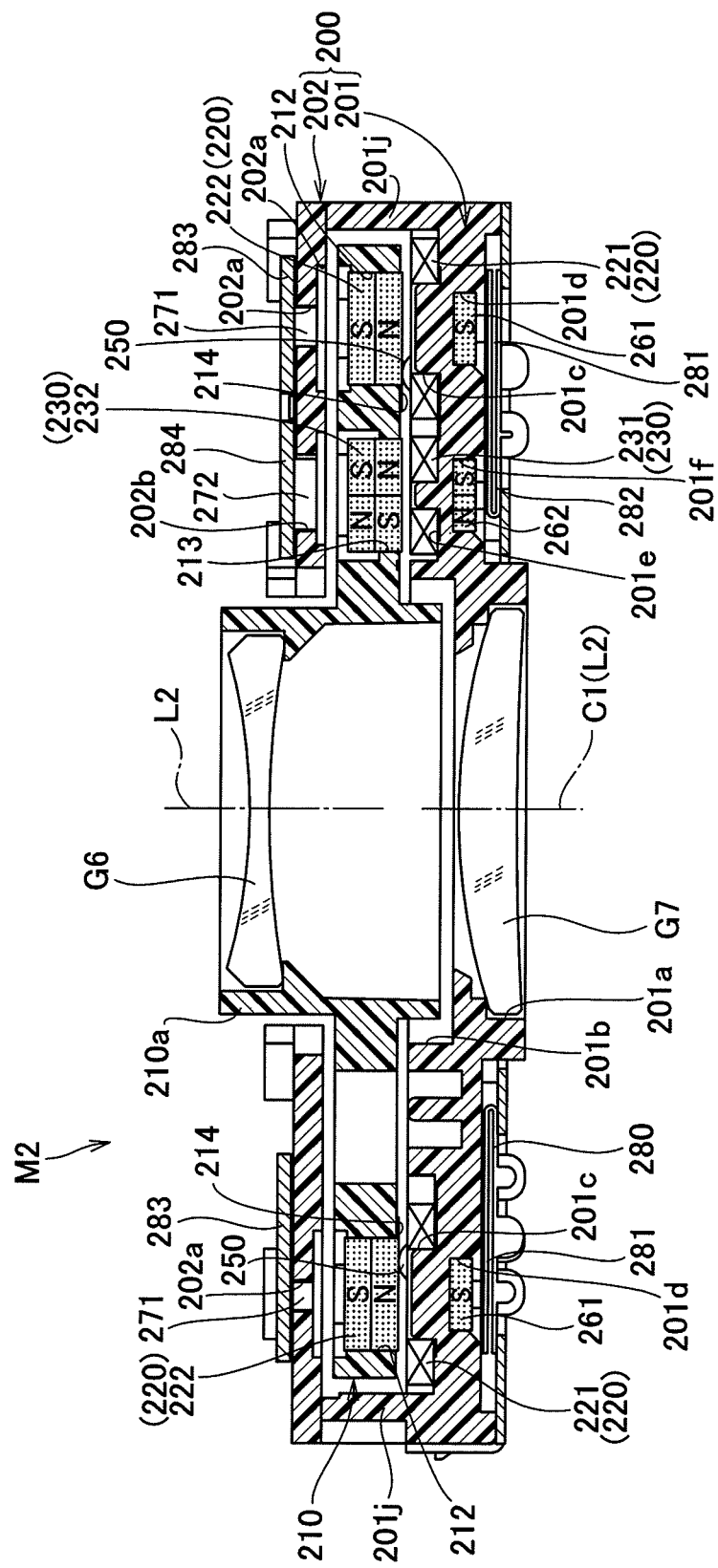
FIG. 22 is a cross-sectional view of the image blur correction apparatus depicted in FIG. 18.
Figure 24:
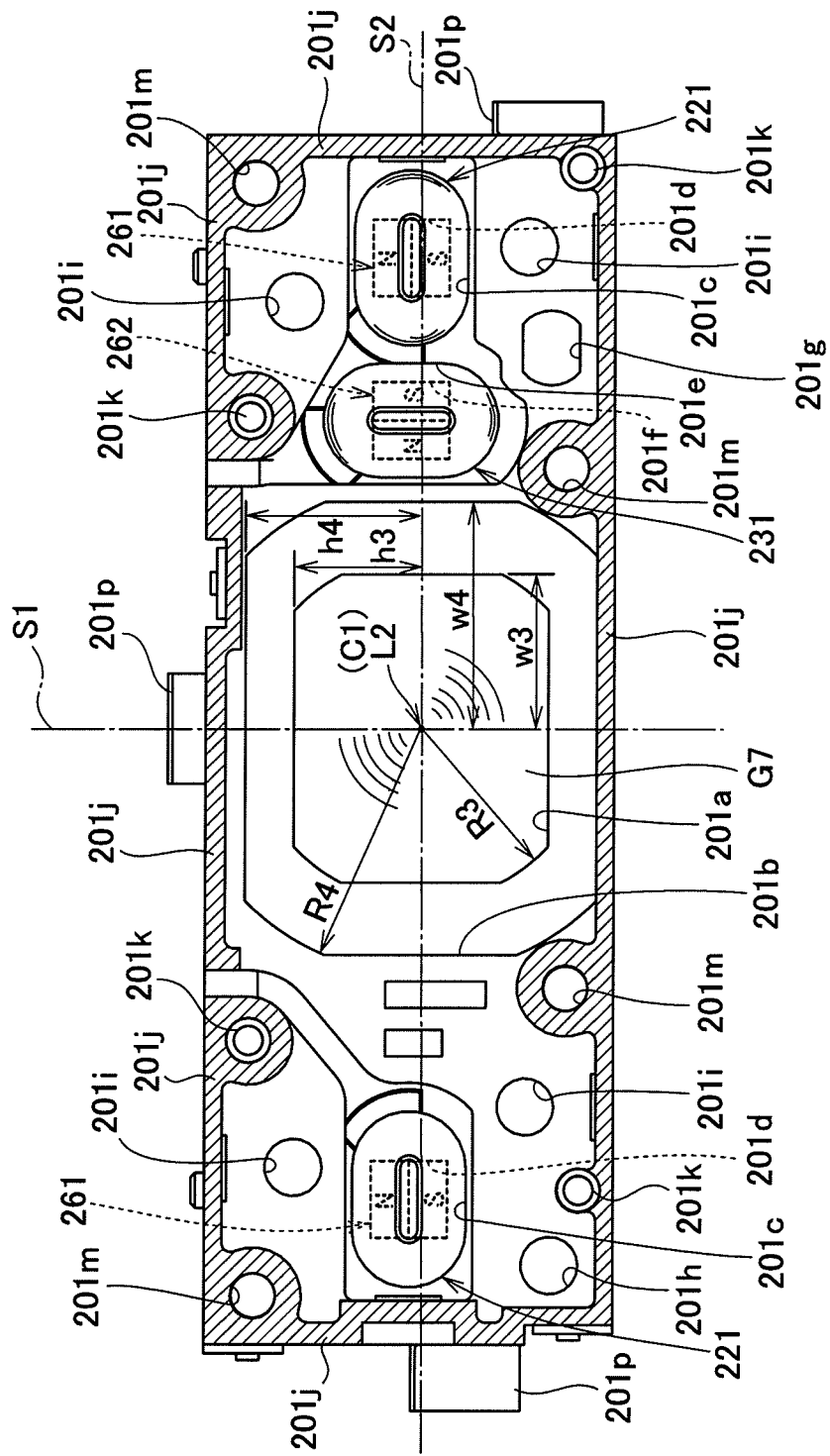
FIG. 24 is a front view showing a state that the cover-like base and a movable holding member are eliminated from the image blur correction apparatus depicted in FIG. 18.
Figure 25:
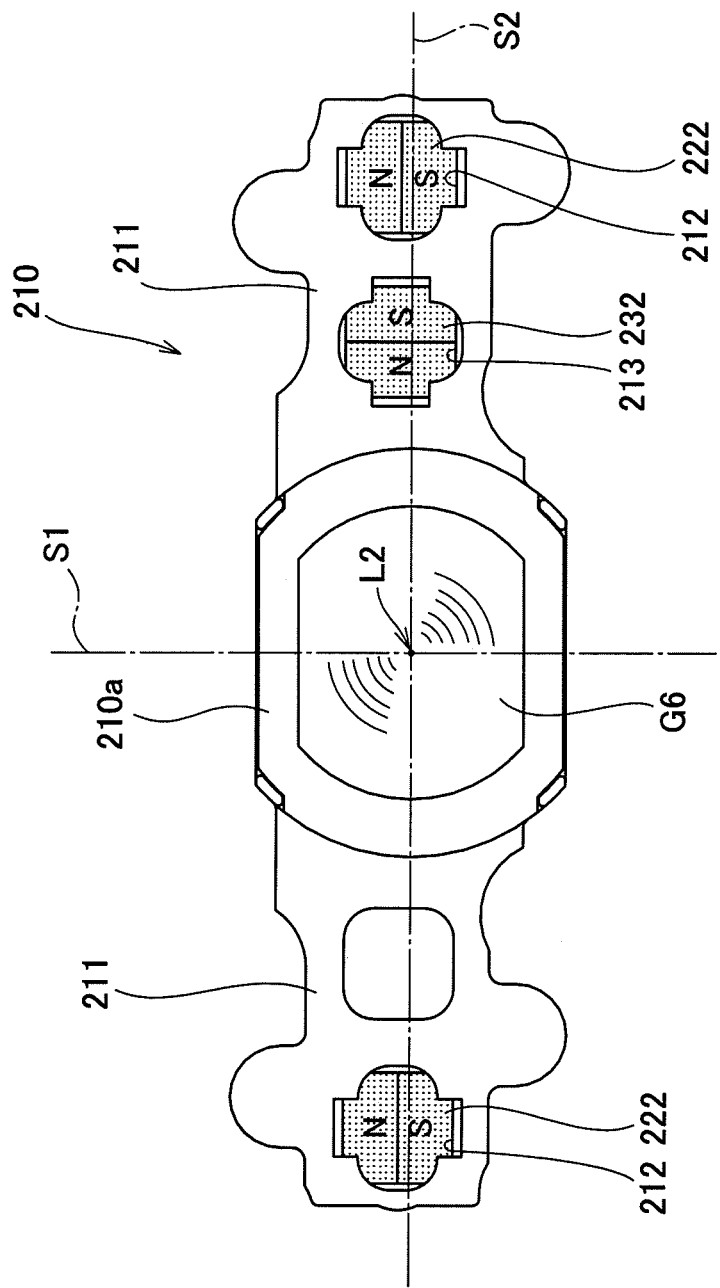
FIG. 25 is a front view showing the movable holding member included in the image blur correction apparatus depicted in FIG. 18.

As shown in FIG. 22 and FIG. 24, the case-like base 201 includes an opening portion 201a in which the lens G7 (a lens having a shape meeting R3>w3>h3, where R3 is an outside diameter, h3 is a dimension from the center in the straight line S1 direction, and w3 is a dimension from the center in the straight line S2 direction as shown in FIG. 24) is fitted and fixed, a concave portion 201b formed around the opening portion 201a (a concave portion having a shape meeting R4>w4>h4, where R4 is an inside diameter, h4 is a dimension from the center in the straight line S1 direction, and w4 is a dimension from the center in the straight line S2 direction as shown in FIG. 24), two fitting concave portions 201c in which the first coils 221 are fitted and fixed, two fitting concave portions 201d in which the first return magnets 261 are fitted and fixed, a fitting concave portion 201e in which the second coil 231 is fitted and fixed, a fitting concave portion 201f in which the second return magnet 262 is fitted and fixed, a through hole 201g in which the guide shaft 61 is inserted and positioned, a through hole 201h in which the anti-rotation shaft 62 is inserted and positioned, four concave portions 201i that receive the spheres 250 as the support mechanism, a substantially rectangular outer peripheral wall 201j formed to surround the periphery of the movable holding member 210, positioning pins 201 and screw holes 201m that are formed in an end face of the outer peripheral wall 201j to position and couple the cover-like base 202, protrusions 201p fitted in the holding portion 13' of the unit case 10, and others.

As shown in FIG. 22 and FIG. 24, the opening portion 201a is formed to be narrow in the straight line S1 direction so as to position the center C1 (coincides with a center L2 of the lens G7) at an intersection of the straight line S1 and the straight line S2, and define an inner wall surface perpendicular to the direction of the straight line S1 and parallel to the straight line S2.

The concave portion 201b is formed with an inside diameter dimension that allows the holding portion 210a of the movable holding member 210 to move in a contactless manner within the range that the movable holding member 210 is driven.

The two fitting concave portions 201c are formed at positions line-symmetric to the straight line S1, and the two fitting concave portions 201d are formed at positions that are line-symmetric to the straight line S1 and correspond to the two fitting concave portions 201c, respectively.

The fore concave portions 201i are formed to rollably receive the spheres 250 in a state that the spheres 250 partially protrude in the optical axis L2 direction. Further, in regard to an arrangement configuration of the four concave portions 201i, as shown in FIG. 24, two concave portions 201i are arranged on one side and two concave portions 201i are arranged on the other side to sandwich the opening portion 201a and the concave portion 201b in the straight line S2 direction. That is, the two concave portions 201i on one side are arranged to correspond to an extending portion 211 of the movable holding member 210 on one side, and the two concave portions 201i on the other side are arranged to correspond to the extending portion 211 of the movable holding member 210 on the other side.

Figure 20:
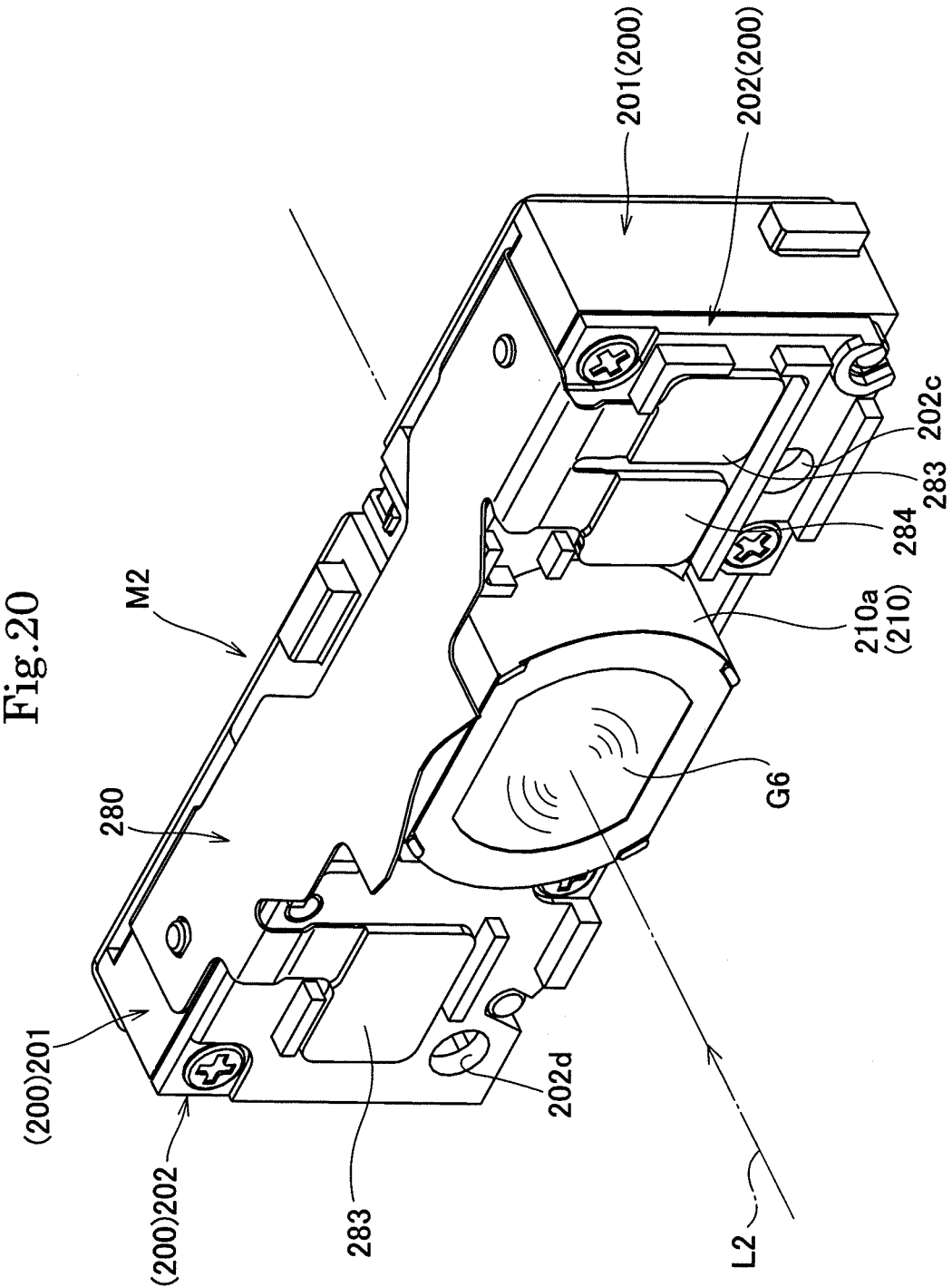
FIG. 20 is a perspective view of the image blur correction apparatus depicted in FIG. 18.
Figure 21:
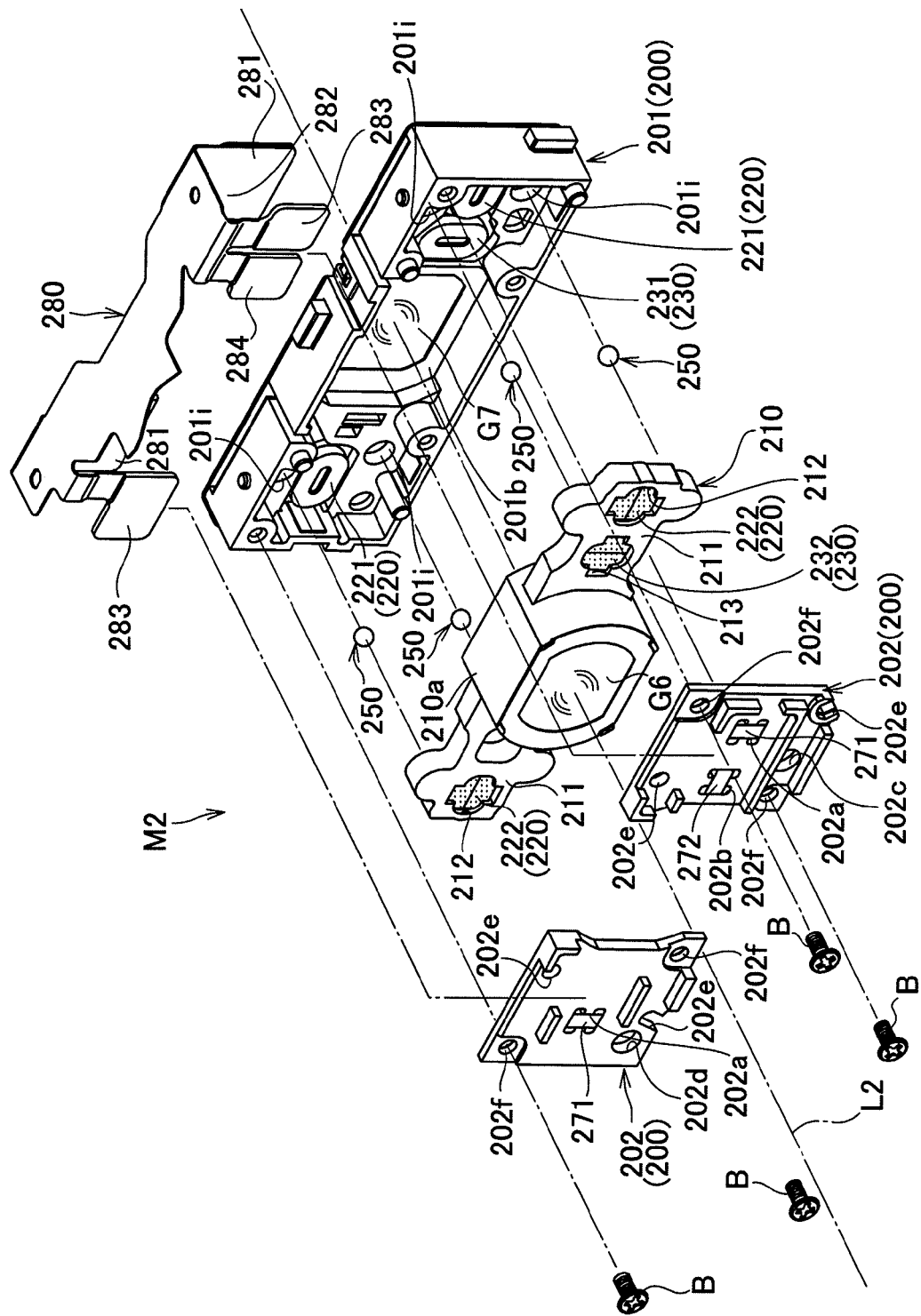
FIG. 21 is an exploded perspective view of the image blur correction apparatus depicted in FIG. 18.

As shown in FIG. 20 to FIG. 22, the cover-like base 202 is formed to be split into tow pieces so as to expose the holding portion 210a of the movable holding member 210, and includes two fitting hole portions 202a in which the first magnetic sensors 271 are fitted and fixed, a fitting hole portion 202b in which the second magnetic sensor 272 is fitted and fixed, a through hole 202c in which the guide shaft 61 is inserted and positioned, a through hole 202d in which the anti-rotation shaft 62 is inserted and positioned, fitting holes (or notches) 202e in which the positioning pins 201k are fitted, circular holes 202f into which screws B are inserted, and others.

That is, in a state that the cover-like base 202 is coupled with the case-like base 201, the two fitting hole portions 202a are formed at positions that are line-symmetric with respect to the straight line S1 and correspond to the two fitting concave portions 201c, and one fitting concave portion 202b is formed at a position corresponding to one fitting concave portion 201e.

Further, the spheres 250 and the movable holding member 210 are accommodated in the case-like base 201, and the cover-like base 202 is coupled with the case-like base from above, whereby the base 200 regulates separation of the movable holding member 210 in the optical axis L2 direction, and holds the movable holding member 210 to be movable within a plane vertical to the optical axis L2.

Therefore, the spheres 250 and the movable holding member 210 are accommodated in the case-like base 201, the cover-like case 202 is assembled, and then these bases can be integrally treated as a module product.

As shown in FIG. 21 to FIG. 23, FIG. 25, and FIG. 26, the movable holding member 210 is formed into a substantially rectangular tabular shape that is substantially flat in the optical axis L2 direction except a part thereof, narrow in the direction of the straight line S1, and long in the direction of the straight line S2, and it includes a cylindrical holding portion 210a that holds the lens G6, two extending portions 211 extending on both sides in the straight line S2 direction to sandwich the holding portion 210a, two fitting holes 212 in which the first drive magnets 222 are fitted and fixed, a fitting hole 213 in which the second drive magnet 232 is fitted and fixed, four abutment surfaces 214 that abut on the four spheres 250 as the support mechanism, and others.

Figure 23:
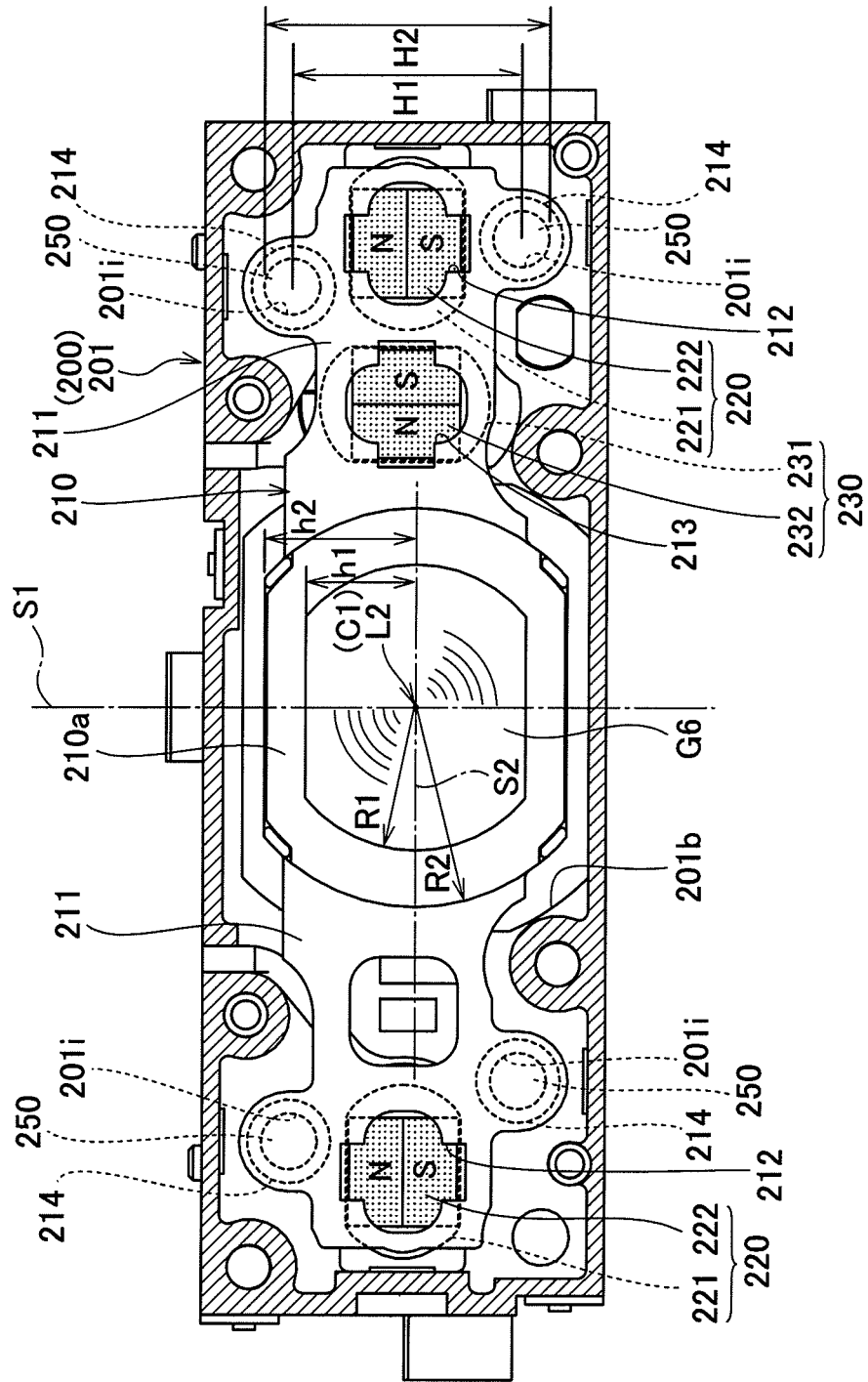
FIG. 23 is a front view showing a state that a cover-like base is eliminated from the image blur correction apparatus depicted in FIG. 18.

The holding portion 210a is formed into a flat cylindrical shape (a cylindrical shape meeting R2>h2, where R2 is an outside diameter and h2 is a dimension from the center in the straight linen S1 direction as shown in FIG. 23) that is narrow in the direction of the straight line S1 so as to hold therein the lens G6 (a lens having a shape meeting R1>h1, where R1 is an outside diameter and h1 is a dimension from the center in the straight line S1 direction as shown in FIG. 23) having parallel cut plans obtained by partially cutting (cutting in parallel to the straight line S2) the outer periphery in the direction of the straight line S1, and it is formed to position the optical axis L2 of the lens G6 at an intersection of the straight line S1 and the straight line S2.

The two fitting holes 212 are formed at positions that are line-symmetric with respect to the straight line S1 and correspond to the two fitting concave portions 201c, respectively, and the one fitting hole 213 is formed at a position corresponding to the one fitting concave portion 201e.

Figure 26:
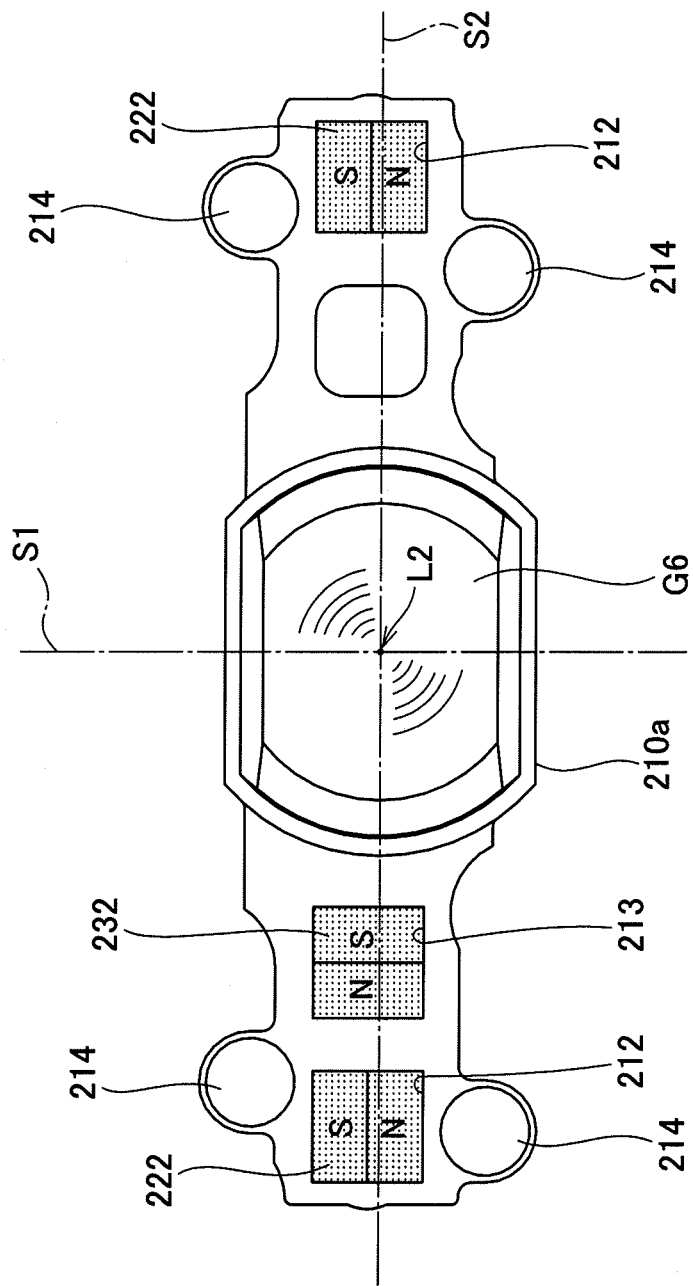
FIG. 26 is a rear view showing the movable holding member included in the image blur correction apparatus depicted in FIG. 18.

As shown in FIG. 26, the four abutment surfaces 214 are arranged to face the four concave portions 201i (the spheres 250) in the optical axis L2 direction in a pause state (a state placed at a pause position where the optical axis L2 of the lens G6 coincides with the center C1 (the optical axis L2 of the lens G7) of the opening portion 201a of the base 200), and each abutment surface 214 is formed into a planar shape having a predetermined area so as not to deviate from a state contacting with the sphere 250 inserted in the corresponding concave portion 201i of the case-like base 201 in the range that the movable holding member 210 two-dimensionally moves within a plane (a plane including the straight line S1 and S2) vertical to the optical axis L2.

That is, the two abutment surface 214 provided on the extending portion 211 on one side are arranged to correspond to the two concave portions 201i provided on one side of the case-like base 201, and the two abutment surfaces 214 provided on the extending portion 211 on the other side are arranged to correspond to the two concave portions 201i provided on the other side of the case-like base 201.

Here, the support mechanism is constituted of the four concave portions 201i provided in the cave-like base 201, the four spheres 250 arranged in the four concave portions 201*i*, and the four abutment surfaces 214 that are provided to the movable holding member 210 and abut on the spheres 250.

In particular, as shown in FIG. 23, assuming that an inter-central distance between the two spheres 250 in the straight line S1 direction is H1 and a distance to the outermost ends is H2 (H2>H1), in a relationship with respect to the outside diameter dimension R2 of the holding portion 210*a*, the spheres 250 are arranged to meet at least Expression (1) of the following expressions:

$$2 \times R2 > H1 \quad (1)$$

$$2 \times R2 > H2 \quad (2)$$

Therefore, simplification of the structure, a reduction in thickness in the optical axis L2 direction, a reduction in width in the straight line S1 direction can be achieved, thereby miniaturizing the entire apparatus.

Further, since the four spheres 250 (and the concave portions 201*i*) are arranged in such a manner that the two spheres 250 (and the concave portions 201*i* and the abutment surfaces 214) face (the abutment surface 214 of) the extending portion 211 on one side and the other two spheres 250 (and the concave portions 201*i*) face (the abutment surface 214) of the extending portion 211 on the other side to sandwich the holding portion 210*a* of the movable holding member 210, the movable holding member 210 can be evenly supported in the longitudinal direction (the straight line S2 direction) thereof without being biased, and hence the movable holding member 210 can be smoothly and highly accurately driven to be positioned at a desired position.

The first drive mechanism 220 drives the movable holding member 210 within the plane (the plane including the straight line S1 and the straight line S2) in the straight line S1 direction (the first direction) vertical to the longitudinal direction (the straight line S2 direction), and it is formed as a voice coil motor including the first coils 221 and the first drive magnets 222 as shown in FIG. 21 to FIG. 23.

As shown in FIG. 22 to FIG. 24, the first coil 221 is formed into a long circle or a substantially elliptic annular shape having a major axis in the direction of the straight line S2 as seen from the optical axis L2 direction, and it is fitted in each of the two fitting concave portions 201*c* of the case-like base 201. That is, the first coils 221 are constituted of two coils arranged to be line-symmetric with respect to the straight line S1.

As shown in FIG. 22 to FIG. 24, the first drive magnet 222 is magnetized to have two poles in the optical axis L2 direction, magnetized to have two poles in the straight line S1 direction, formed into a rectangular shape magnetized to have four poles as a whole, and it is fitted and fixed in each of the two fitting holes 212 of the movable holding member 210. That is, the first drive magnets 222 are arranged to be line-symmetric with respect to the straight S1 line and constituted of two drive magnets arranged to face the first coils 221 (the two coils) in the optical axis L2 direction.

Further, the first drive mechanism 220 is configured to generate electromagnetic drive force in the first direction, i.e., the direction of the straight line S1 by turning ON/OFF energization for the first coils 221 in forward and backward directions. As descried above, since the first drive mechanism 220 that drives the movable holding member 210 in the first direction (the straight line S1 direction) vertical to the longitudinal direction (the straight line S2 direction) is constituted of the two drive magnets 222 arranged on both sides of the movable holding member 210 in the longitudinal direction (the straight line S2 direction) and the two coils 221 corresponding to the two drive magnets 222, when drive force is generated in the first direction, drive force is generated on each of both the sides of the movable holding member 210 in the longitudinal direction, a rotational moment that rotates the movable holding member 210 can be prevented from being produced, and the movable holding member 210 can be highly accurately driven by the simple configuration.

The second drive mechanism 230 is configured to drive the movable holding member 210 within the plane (the plane including the straight line S1 and the straight line S2) in the longitudinal direction (the straight line S2 direction, the second direction), and it is formed as a voice coil motor including the second coil 231 and the second drive magnet 232 as shown in FIG. 21 to FIG. 23.

As shown in FIG. 22 to FIG. 24, the second coil 231 is formed into a long circle or a substantially elliptic annular shape having a major axis in the direction of the straight line S1 as seen from the optical axis L2 direction, and it is fitted and fixed in one fitting concave portion 201*e* of the case-like base 201. That is, the second coil 231 is constituted of one coil arranged to be closer to the straight line S1 (the opening portion 201*a*) than the first coil 221 arranged on the same side.

As shown in FIG. 22 to FIG. 24, the second drive magnet 232 is magnetized to have two poles in the optical axis L2 direction, magnetized to have two poles in the straight line S2 direction, formed into a rectangular shape magnetized to have four poles as a whole, and fitted and fixed in one fitting hole 213 of the movable holding member 210. That is, the second drive magnet 232 is constituted of one drive magnet that is arranged to be closer to the straight line S1 (the holding portion 210*a*) than the first drive magnet 222 arranged on the same side and also arranged to face the second coil 231 in the optical axis L2 direction.

Further, the second drive mechanism 230 is configured to generate electromagnetic drive force in the second direction, i.e., the direction of the straight line S2 by turning on/off energization for the second coil 231 in forward and reverse directions. As described above, since the second drive mechanism 230 is configured to drive the movable holding member 210 in the longitudinal direction (the straight line S2 direction), even one coil 231 and one drive magnet 232 can obtain desired linear drive force without producing a rotational moment.

As shown in FIG. 22 and FIG. 24, each of the first return magnet 261 is formed into a rectangular shape magnetized to have two poles in the straight line S1 direction, and it is fitted and fixed in each of the two fitting concave portions 201*d* of the case-like base 201. That is, the first return magnets 261 are constituted of two return magnets that are arranged to be line-symmetric with respect to the straight line S1 and also arranged to face the first drive magnets 222 (the two drive magnets) in the optical axis L2 direction.

As shown in FIG. 22 and FIG. 24, the second return magnet 262 is formed into a rectangular shape magnetized to have two poles in the straight line S2 direction, and it is fitted and fixed in one fitting concave portion 201*f* of the case-like base 201. That is, the second return magnet 262 is constituted of one return magnet that is arranged to be closer to the straight line S1 (the opening portion 201*a*) than the first return magnet 261 arranged on the same side and also arranged to face the second drive magnet 232 in the optical axis L2 direction.

Furthermore, the first return magnet 261 faces the first drive magnet 222 and forms a magnetic path to exercise a magnetic action, the second return magnet 262 faces the second drive magnet 232 and forms a magnetic path to exercise a magnetic action, the movable holding member 210 is returned to a predetermined pause position (a position at which the optical axis L2 of the lens G6 coincides with the optical axis L2 (the center C1 of the opening portion 201a) of the lens G7 fixed to the base 200 (the case-like base 201), and stable holding force can be generated in the pause state that the first coil 221 and the second coil 231 are not energized.

As described above, in the pause state, the movable holding member 210 is automatically returned (centered) to and stably held at the predetermined pause position by magnetic attractive action of the first return magnets 261 and the second return magnet 262 as the returning means and the first drive magnets 222 and the second drive magnet 232 as the driving means.

Therefore, drive control, e.g., initialization is not required at the time of driving, and shakiness and others of the movable holding member 210 can be avoided in the pause state. Moreover, since the first drive magnets 222 and the second drive magnet 232 as the driving means are used for the mutual interaction with the first return magnets 261 and the second return magnet 262 as the returning means, simplification of the structure, miniaturization of the apparatus, and others can be achieved.

Each of the first magnetic sensors 271 is a hall element or the like that detects a change in magnetic flux density and outputs this change as an electric signal, and it is fitted and fixed in each of the two fitting concave portions 202a of the cover-like base 202 as shown in FIG. 21 and FIG. 22. That is, the first magnetic sensors 271 are constituted of two magnetic sensors that are arranged to be line-symmetric with respect to the straight line S1 and also arranged to face the first drive magnets 222 (the two drive magnets) in the optical axis L2 direction.

Further, each first magnetic sensor 271 forms a magnetic circuit between itself and each first drive magnet 222 fixed to the movable holding member 210 and detects a change in magnetic flux density caused due to relative movement of the movable holding member 210 with respect to the base 200, thereby detecting a position of the movable holding member 210.

It is to be noted that the configuration where the two magnetic sensors facing the two drive magnets 222 are adopted as the first magnetic sensors 271 has been described, but it is possible to adopt one magnetic sensor that faces the drive magnet 222 arranged on the opposite side of the side where the second drive magnet 232 is arranged with respect to the straight line S1, for example.

The second magnetic sensor 272 is, e.g., a hall element that detects a change in magnetic flux density and outputs this change as an electric signal, and it is fitted and fixed in the one fitting hole portion 202b of the cover-like base 202 as shown in FIG. 21 and FIG. 22. That is, the second magnetic sensor 272 is constituted of one magnetic sensor arranged to be closer to the straight line S1 than the first magnetic sensor 271 arranged on the same side and arranged to face the second drive magnet 232 in the optical axis L2 direction.

Furthermore, the second magnetic sensor 272 forms a magnetic circuit between itself and the second drive magnet 232 fixed to the movable holding member 210 and detects a change in magnetic flux density caused due to relative movement of the movable holding member 210 with respect to the base 200, thereby detecting a position of the movable holding member 210.

As described above, since the first magnetic sensor 271 and the second magnetic sensor 272 are fixed to the base 200 (the cover-like base 202), wiring is easier than that in a situation where these sensors are provided to the movable holding member 210, disconnection and the like involved by movement can be avoided, and simplification of the structure, a reduction in the number of components, miniaturization of the apparatus, and others can be achieved as compared with a situation where dedicated magnets are provided since the first drive magnets 222 and the second drive magnet 232 are also used for positional detection.

As shown in FIG. 20 to FIG. 22, the flexible wiring board 280 is formed to have connecting portions 281 connected to the first coils 221 of the first drive mechanism 220, a connecting portion 282 connected to the second coil 231 of the second drive mechanism 230, connecting portions 283 connected to the first magnetic sensors 271, and a connecting portion 284 connected to the second magnetic sensor 272.

Furthermore, the flexible wiring board 280 is arranged in contact with the back surface of the case-like base 201 and the front surface of the cover-like base 202 and electrically connected to these bases in a state that the spheres 250 and the movable holding member 210 are incorporated with respect to the case-like base 201 and the cover-like base 202 is disposed from above.

As described above, since the flexible wiring board 280 is fixed to the base 200 (the case-like base 201 and the cover-like base 202) that does not move in both the optical axis L2 direction and the plane direction vertical to the optical axis L2, it does not have to be moved in the optical axis L2 direction and the plane direction vertical to the optical axis L2, and the flexible wiring board 280 does not have to be bent to be arranged. Therefore, an arrangement space of the flexible wiring board 280 can be reduced, whereby the apparatus can be miniaturized and the durability can be improved.

At the time of assembling the above-mentioned image blur correction apparatus M2, the case-like base 201 in which the coils 221 and 231 and the return magnets 261 and 262 are incorporated, the cover-like base 202 in which the magnetic sensors 271 and 272 are incorporated, and the movable holding member 210 in which the spheres 250 and the drive magnets 222 and 232 are incorporated are prepared.

Furthermore, the spheres 250 are inserted into the concave portions 201i of the case-like base 201, and then the movable holding member 210 is accommodated in the case-like base 201 in such a manner that the abutment surfaces 214 abut on the spheres 250. At this time, since the first return magnets 261 and the second return magnet 262 fixed to the case-like base 201 and the first drive magnets 222 and the second drive magnet 232 fixed to the movable holding member 210 magnetically attract each other, the movable holding member 210 is supported to be movable within the plane vertical to the optical axis L2 and automatically centered to the pause position without being separated from the case-like base 201 even if springs that exerts urging force in conventional examples are not used.

Subsequently, the cover-like base 202 is put to cover the extending portions 211 of the movable holding member 210, and it is coupled with the case-like base 201 by using the screws B.

At last, the flexible wiring board 280 is attached so as to face the back surface of the case-lie base 201 and the front surface of the cover-like base 202.

As described above, when the spheres 250 are fitted in the concave portions 201i of the case-like base 201, the movable holding member 210 is fitted to the case-like base 201 from above in such a manner that the abutment surfaces 214 abut on the spheres 250, and the cover-like base 202 is further attached from above, the apparatus assembling operation can be easily performed based on the simple procedure, the thickness of the apparatus can be reduced in the optical axis L2 direction, and a reduction in width and size of the apparatus can be achieved in the direction vertical to the optical axis L2 and the direction vertical to the longitudinal direction of the movable holding member 210 (the straight line S2 direction).

Moreover, besides the magnetic attractive force of the return magnets 261 and 262 and the drive magnets 222 and 232, provision of the cover-like base 202 enables supporting the movable holding member 210 to be movable with respect to the base 200 and also enables assuredly preventing the movable holding member 210 from being separated from the base 200 in the optical axis L2 direction even if an impact shock and the like are received from the outside.

A correcting operation of the above-mentioned image blur correction apparatus M2 will now be briefly described with reference to FIG. 27A to FIG. 28C.

Figure 27A:
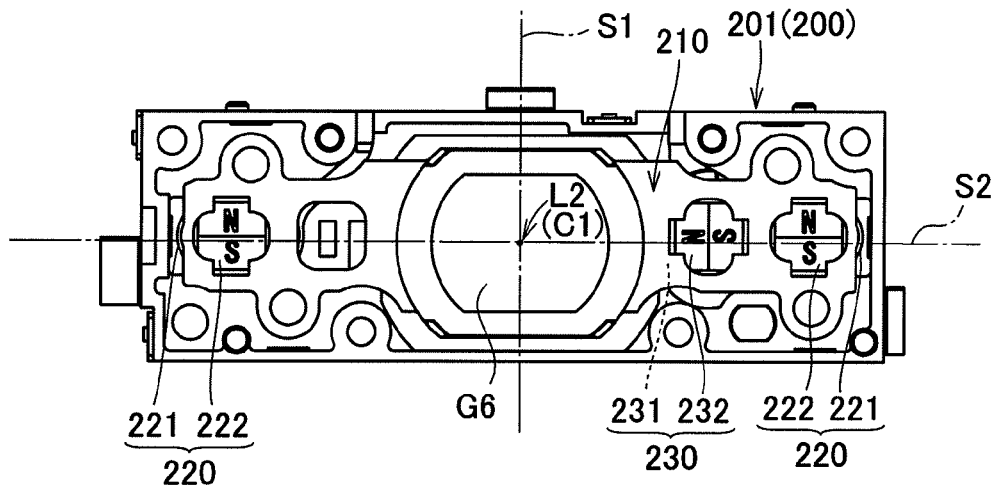
FIG. 27A is a plan view for explaining an operation of the image blur correction apparatus depicted in FIG. 18.

First, in the pause state that the first coils 221 and the second coil 231 are not energized, the movable holding member 210 is returned (centered) to and held at the pause position where the optical axis L2 of the lens G6 coincides with the center C1 (i.e., the optical axis L2 of the lens G7) of the opening portion 201a of the base 200 by the return action of the returning means (the first return magnets 261 and the second return magnet 262) as shown in FIG. 27A.

Figure 27B:
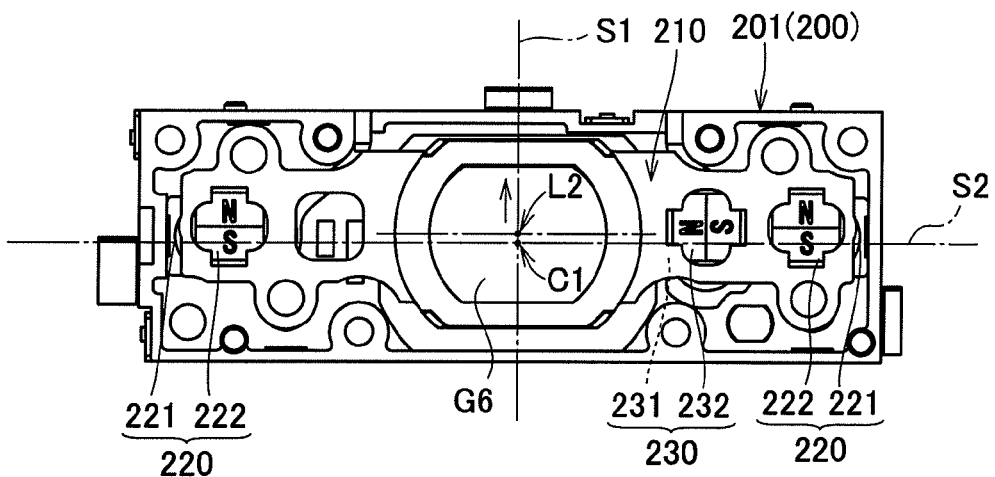
FIG. 27B is a plan view for explaining the operation of the image blur correction apparatus depicted in FIG. 18.

Additionally, for example, when upwardly shifting the movable holding member 210 (the lens G6) from the pause state depicted in FIG. 27A, drive force is generated in the upward direction of the first direction (the straight line S1 direction) by the first drive mechanism 220. As a result, the movable holding member 210 is moved upward in the straight line S1 direction as shown in FIG. 27B.

Figure 27C:
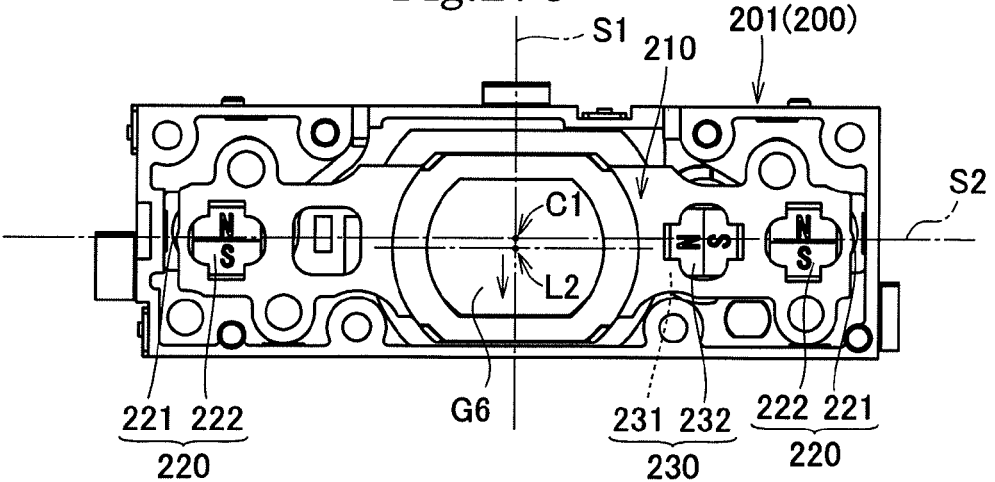
FIG. 27C is a plan view for explaining the operation of the image blur correction apparatus depicted in FIG. 18.

Further, for example, when downwardly shifting the movable holding member 210 (the lens G6) from the pause state depicted in FIG. 27A, drive force is generated in the downward direction of the first direction (the straight line S1 direction) by the first drive mechanism 220. As a result, the movable holding member 210 is moved downward in the straight line S1 direction as shown in FIG. 27C.

As described above, since the first drive mechanism 220 that drives the movable holding member 210 in the first direction (the straight line S1 direction) is constituted of the two drive magnets 222 arranged on both the sides of the movable holding member 210 in the longitudinal direction and the two coils 221 corresponding to the two drive magnets, drive force is generated on both the sides of the movable holding member 210 in the longitudinal direction when producing the drive force in the first direction, a rotational moment that rotates the movable holding member 210 can be prevented from being generated, and the movable holding member 210 can be highly accurately driven with the simple configuration.

Figure 28A:
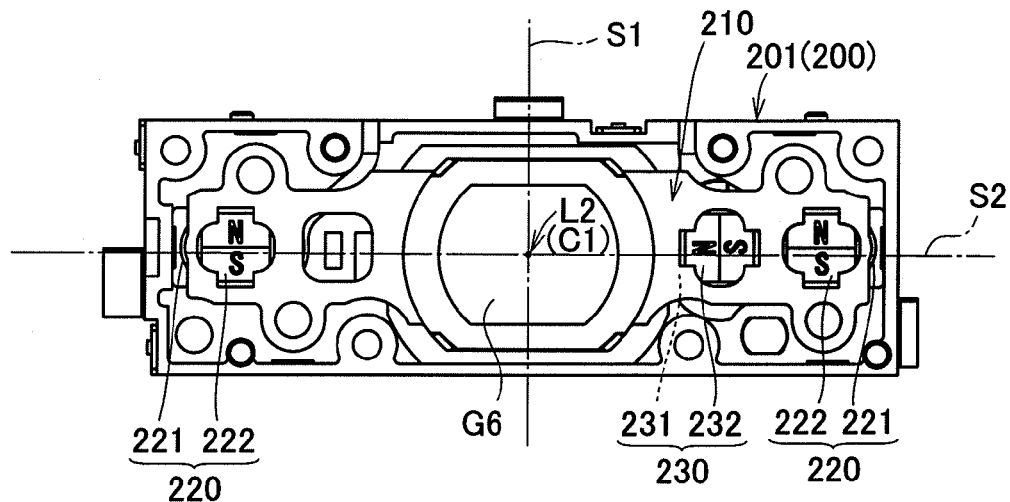
FIG. 28A is a plan view for explaining an operation of the image blur correction apparatus depicted in FIG. 18.
Figure 28B:
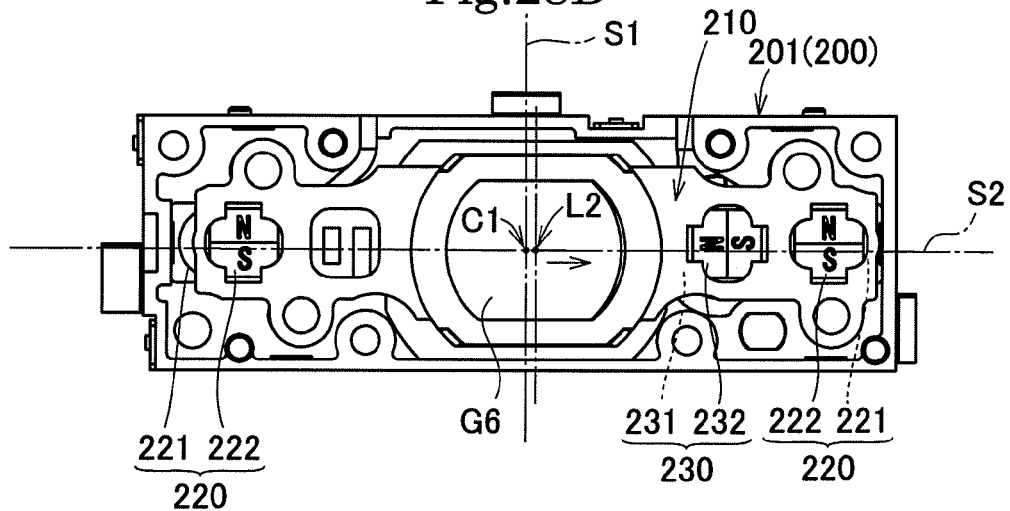
FIG. 28B is a plan view for explaining an operation of the image blur correction apparatus depicted in FIG. 18.

Subsequently, as shown in FIG. 28A, for example, when shifting the movable holding member 210 (the lens G6) to the right side from the pause state that the movable holding member 210 has returned to the pause position at which the optical axis L2 of the lens G6 coincides with the center C1 of the opening portion 201a of the base 200 (i.e., the optical axis L2 of the lens G7) by the returning action of the returning means (the first return magnets 261 and the second return magnet 262), drive force is generated in the right direction of the second direction (the straight line S2 direction) by the second drive mechanism 230. As a result, the movable holding member 210 is moved toward the right side in the straight line S2 direction as depicted in FIG. 28B.

Figure 28C:
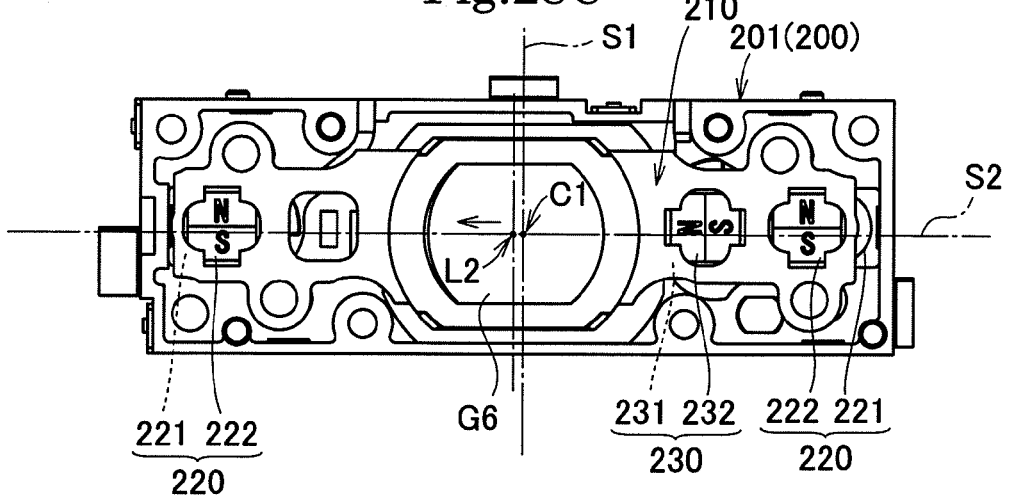
FIG. 28C is a plan view for explaining the operation of the image blur correction apparatus depicted in FIG. 18.

Further, for example, when shifting the movable holding member 210 (the lens G6) toward the left side from the pause state depicted in FIG. 28A, drive force is generated in the left direction of the second direction (the straight line S2 direction) by the second drive mechanism 230. As a result, the movable holding member 210 is moved toward the left direction of the straight line S2 direction as depicted in FIG. 28C.

As described above, in a state that the movable holding member 210 is movably supported by the support mechanism (the four spheres 250), the movable holding member 210 is two-dimensionally moved within the plane vertical to the optical axis L2 with respect to the base 200 based on electromagnetic drive force generated by energization to the first coils 221 and the second coil 231 in cooperation with the first drive magnets 222 and the second drive magnet 232, thereby highly accurately correcting an image blur caused due to hand movement, and others.

Figure 29:
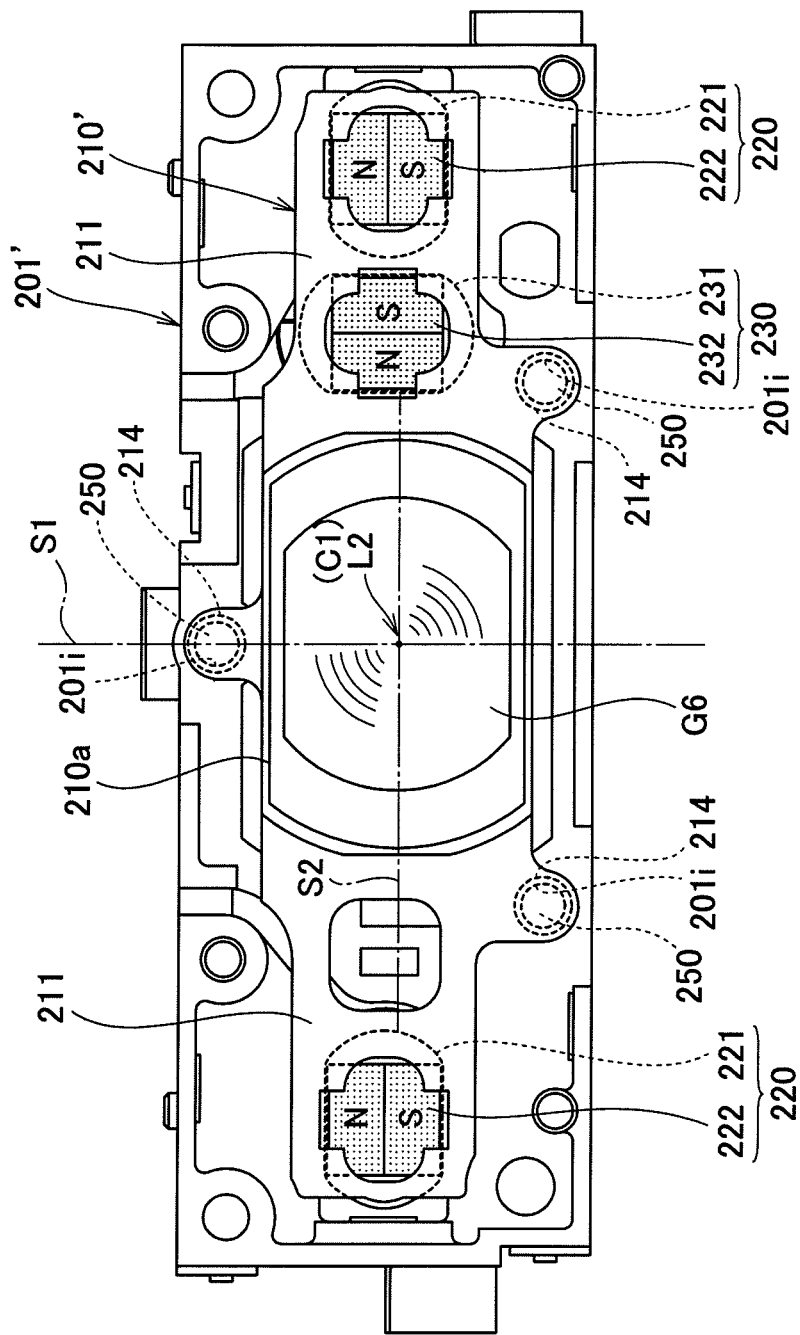
FIG. 29 is a front view of still another embodiment of an image blur correction apparatus, showing a state that a cover-like base is eliminated.

FIG. 29 shows a modification of the image blur correction apparatus M2 according to the present invention, and this modification is equal to the foregoing embodiment except that the number of each of the spheres 250, the concave portions 201i, and the abutment surfaces 214 is changed to three in the support mechanism. Therefore, like reference numerals denote like structures to omit a description thereof.

In this embodiment, as shown in FIG. 29, a case-like base 201' has three concave portions 201i, and a movable holding member 210' has three abutment surfaces 214.

Further, one concave portion 201i is arranged on the upper side on a straight line S1 running through the center C1 of an opening portion 201a, and the other two concave portions 201i are arranged on the lower side at a position line-symmetric to the straight line S1.

Furthermore, one abutment surface 214 is arranged at a position corresponding to the concave portion 201i placed on the straight line S1, and the other two abutment surfaces 214 are arranged at positions corresponding to the two concave portions 201i placed at positions line-symmetric with respect to the straight line S1.

That is, two spheres 250 in the three spheres 250 are arranged in regions facing an extending portion 211 on one side and an extending portion 211 on the other side to sandwich a holding portion 210a of the movable holding member 210', two concave portions 201i in the three concave portions 201i are arranged at positions corresponding to the two spheres 250 corresponding to the respective extending portions 211, and two abutment surfaces 214 in the three abutment surfaces 214 are arranged at positions corresponding to the two spheres 250 corresponding to the respective extending portions 214.

According to this configuration, since the movable holding member 210' is supported by the one sphere 250 arranged on the straight line S1 and the two spheres 250 corresponding to the extending portion 211 on the one side and the extending portion 211 on the other side to sandwich the holding portion 210a therebetween, the structure can be more simplified, and the movable holding member 210' can be evenly supported in the longitudinal direction without being biased, whereby the movable holding member 210' can be smoothly and highly accurately driven to be positioned at a desired position.

Figure 30:
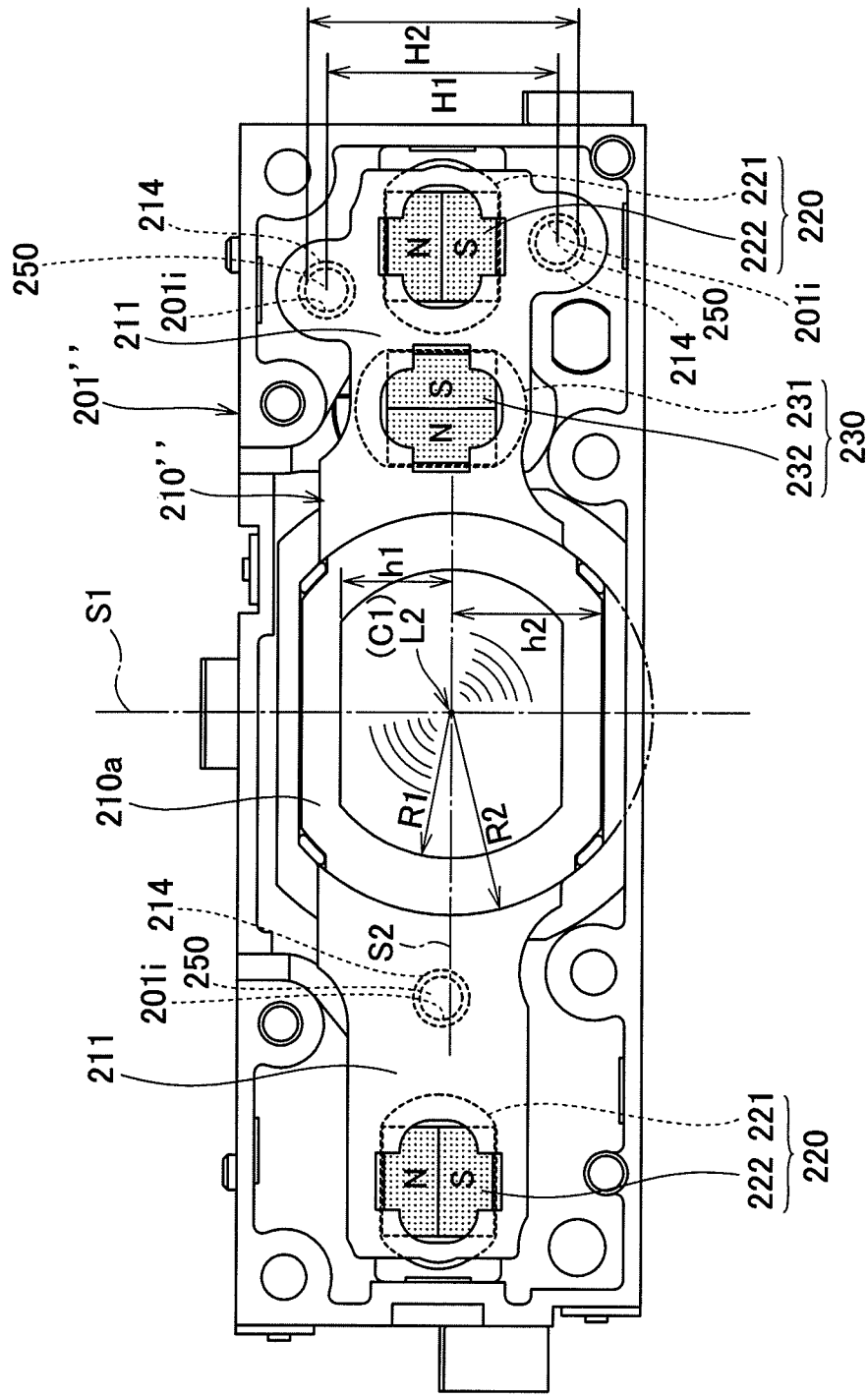
FIG. 30 is a front view of yet another embodiment of an image blur correction apparatus, showing a state that a cover-like base is eliminated.

FIG. 30 shows another modification of the image blur correction apparatus M2 according to the present invention, and this modification is equal to the foregoing embodiment except that the number of each of the spheres 250, the concave portions 201i, and the abutment surfaces 214 is changed to three in the support mechanism and arrangement positions of the spheres 250 are changed as compared with the embodiment shown in FIG. 29. Therefore, like reference numerals denote like structures to omit a description thereof.

In this embodiment, as shown in FIG. 30, a case-like base 201" has three concave portions 201i, and a movable holding member 210" has three abutment surfaces 214.

Furthermore, one concave portion 201i is arranged on a left extending portion 211 with respect to a straight line S1, and the other two concave portions 201i are arranged on a right extending portion 211 with respect to the straight line S1.

Moreover, one abutment surface 214 is arranged at position corresponding to the concave portion 201i placed on the left side with respect to the straight line S1, and the other two abutment surfaces 214 are arranged at positions corresponding to the two concave portions 201i placed on the right side with respect to the straight line S1.

Here, the right extending portion 211 that holds the first drive magnet 222 alone is supported by one sphere 250, and the left extending portion 211 that holds the first drive magnet 222 and the second drive magnet 232 are supported by the two spheres 250.

That is, two spheres 250 in the three spheres 250 are arranged in regions facing the extending portion 211 on one side and the extending portion 211 on the other side to sandwich a holding portion 210a of the movable holding member 210", two concave portions 201i in the three concave portions 201i are arranged at positions corresponding to the two spheres 250 corresponding to the respective extending portions 211, and two abutment surfaces 214 in the three abutment surfaces 214 are arranged at positions corresponding to the two spheres 250 corresponding to the respective extending portions 214.

According to this configuration, since the movable holding member 210" is supported by the one sphere 250 corresponding to the extending portion 211 (holding the one drive magnet 222) on one side and the two spheres 250 facing the extending portion 211 (holding the two drive magnets 222 and 232) on the other side to sandwich the holding portion 210a, the movable holding member 210" can be evenly supported in the longitudinal direction without being bias while simplifying the structure, whereby the movable holding member 210" can be smoothly and highly accurately driven to be positioned at a desired position.

Although each of the first coils 121 and 221 and the second coils 131 and 231 has the long circular shape or the substantially elliptic annular shape in the foregoing embodiments, the present invention is not limited thereto, and coils having a substantially rectangular annular shape or any other annular shapes can be used.

Although the first magnetic sensors 171 and 271 and the second magnetic sensors 172 and 272 constituted of the hall elements have been explained as the position detecting means in the foregoing embodiments, the present invention is not limited thereto, and any other magnetic sensors may be adopted.

Although the configuration that the concave portions 104 and 201i accommodating the spheres 150 and 250 are provided to the bases 100 and 200 and the abutment surfaces 114 and 214 abutting on the spheres 150 and 250 are provided to the movable holding members 110, 210, 210', and 210" has been described as the support mechanism that supports the movable holding member in the foregoing embodiments, the present invention is not limited thereto, and a configuration that the concave portions are provided to the movable holding member and the abutments surfaces are provided to the base may be adopted as a reverse pattern. Further, although the three or four concave portions 104 or 201i, the three or four spheres 150 or 250, and the three or four abutment surfaces 114 or 214 have been described, the present invention is not limited thereto, and five or more concave portions, spheres, and abutment surfaces may be adopted.

Although the description has been given as to the example adopting the support mechanism according to the present invention in the configuration that the coils 121, 131, 221, and 231, the return magnets 161, 162, 261, and 262, and the magnetic sensors 171, 172, 271, and 272 are fixed to the bases 100 and 200 and the drive magnets 122, 132, 222, and 232 are fixed to the movable holding members 110, 210, 210', and 210", the present invention is not limited thereto, and the support mechanism according to the present invention may be adopted in a configuration that the drive magnets are fixed to the base and the coils, the return magnets, and the magnetic sensors are fixed to the movable holding member as a reverse pattern.

Although the image blur correction apparatus applied to a camera (the image pickup unit U) mounted in a personal digital assistance has been described in the foregoing embodiments, a configuration including the image blur correction apparatus having the above-described structure may be adopted in any other image pickup unit including a plurality of lenses for imaging, an image pickup element, and a housing.

According to the configuration, since the image blur correction apparatus is included in the configuration that the plurality of lenses for imaging are arranged in the optical axis direction, correction lenses held by the movable holding member are appropriately driven, and an image blur caused due to hand movement and others can be highly accurately corrected, thereby obtaining an excellent shot image by the image pickup element.

As described above, since the image blur correction apparatus according to the present invention can highly accurately correct an image blur caused due to hand movement and others and can automatically perform a returning operation while achieving simplification of the structure, a reduction in size and thickness of the apparatus in the optical axis direction of the lenses and the direction vertical to the optical axis direction, simplification and facilitation of the assembling operation, and others, this apparatus can be of course applied to a camera mounted in a personal digital assistance such as a mobile phone or a portable music player that should be reduced in size and thickness, and it is also useful in a regular digital camera, any other portable optical device, a personal computer having such a device incorporated therein, and others.

The invention claimed is:

1. An image blur correction apparatus comprising:
a base having an opening portion;
a movable holding member holding a lens;
a support mechanism supporting the movable holding member, and being configured to be movable within a plane perpendicular to an optical axis of the lens;
a driving device configured to drive the movable holding member within the plane;
a position detecting device configured to detect a position of the movable holding member; and
a returning device configured to return the movable holding member to a predetermined pause position in a pause state,
wherein the driving device comprises a coil fixed to one of the base and the movable holding member, and a drive magnet fixed to the other of the base and the movable holding member at a position where the drive magnet faces the coil, and
wherein the returning device comprises a return magnet facing the drive magnet and fixed to one of the base and the movable holding member to generate a magnetic force for returning the movable holding member to the pause position and holding the movable holding member at the pause position without a yoke being arranged between the return magnet and the drive magnet, the position detecting device comprises a magnetic sensor fixed to one of the base and the movable holding member at a position where the magnetic sensor faces the drive magnet to form a magnetic circuit in cooperation with the drive magnet without a yoke being arranged between the magnetic sensor and the drive magnet, and the support mechanism comprises at least three concave portions disposed on one of the base and the movable holding member, at least three spheres rollably arranged in the at least three concave portions in a protruding state, and at least three abutment surfaces disposed on the other of the base and the movable holding member to abut the at least three spheres.

2. The image blur correction apparatus according to claim 1, wherein the movable holding member has a holding portion in which the lens is fitted and held, two extending portions extending on both sides to sandwich the holding portion, and the at least three abutment surfaces, and the base has the opening portion which is configured to movably receive the holding portion or disposed in a region facing the holding portion, and the at least three concave portions.

3. The image blur correction apparatus according to claim 2, wherein the base includes a case-shaped base defining the opening portion, the at least three concave portions, an outer peripheral wall disposed so as to surround a periphery of the movable holding member, and a cover-shaped base that is detachably coupled with the case-shaped base to regulate separation of the movable holding member in the optical axis direction in a state that the spheres and the movable holding member are accommodated in the case-shaped base.

4. The image blur correction apparatus according to claim 2, wherein the at least three spheres include at least two spheres arranged in regions facing the extending portion on one side and the extending portion on the other side to sandwich the holding portion of the movable holding member, the at least three concave portions include at least two concave portions arranged at positions corresponding to the at least two spheres, and the at least three abutment surfaces include at least two abutment surfaces arranged at positions corresponding to the at least two spheres.

5. The image blur correction apparatus according to claim 4, wherein the at least three spheres include one sphere arranged on a straight line that is perpendicular to the optical axis and a longitudinal direction of the movable holding member and runs through a center of the holding portion or the opening portion, and two spheres arranged at positions that are line-symmetric with respect to the straight line, the at least three concave portions include one concave portion arranged in a region corresponding to the one sphere and two concave portions arranged in regions corresponding to the two spheres, and the at least three abutment surfaces include one abutment surface arranged in a region corresponding to the one sphere and two abutment surfaces arranged in regions corresponding to the two spheres.

6. The image blur correction apparatus according to claim 5, wherein the holding portion is disposed so as to fit and hold the lens, the outer periphery of the lens being partially cut, and the one concave portion, the one sphere, and the one abutment surface are arranged adjacent an outer wall of the holding portion on the straight line.

7. The image blur correction apparatus according to claim 1, wherein one of the base and the movable holding member has a plurality of coupling pins extending in a direction parallel to the plane, and the other of the base and the movable holding member has a plurality of coupling portions coupled with the coupling pins to enable the movable holding member to move two' dimensionally in the plane.

8. The image blur correction apparatus according to claim 1, wherein the driving device includes a first drive mechanism configured to drive in a first direction within the plane, and a second drive mechanism configured to drive in a second direction within the plane, the coil includes a first coil included in the first drive mechanism, and a second coil included in the second drive mechanism, the drive magnet includes a first drive magnet included in the first drive mechanism and facing the first coil, and a second drive magnet included in the second drive mechanism and facing the second coil, the return magnet includes a first return magnet facing the first drive magnet, and a second return magnet facing the second drive magnet, and the magnetic sensor includes a first magnetic sensor facing the first drive magnet, and a second magnetic sensor facing the second drive magnet.

9. The image blur correction apparatus according to claim 8, wherein the first drive mechanism drives the movable holding member within the plane in a direction perpendicular to a longitudinal direction thereof, the first drive magnet includes two drive magnets arranged on the two extending portions to sandwich the holding portion in the movable holding member, the first coil includes two coils arranged to face the two drive magnets of the first drive magnet in the case-shaped base, the first return magnet includes two return magnets arranged to face the two drive magnets of the first drive magnet in the case-shaped base, and the first magnetic sensor includes at least one magnetic sensor arranged to face at least one of the two drive magnets of the first drive magnet in the cover-shaped base.

10. An image pickup unit comprising a plurality of lenses for imaging, an image pickup element, and a housing, wherein the unit further comprises an image blur correction apparatus according to claim 1.

* * * * *